United States Patent
Iino et al.

(10) Patent No.: US 6,418,115 B1
(45) Date of Patent: *Jul. 9, 2002

(54) EXCHANGE FOR CHANGING A ROUTE OF A TRANSMISSION PATH TO BYPASS A MALFUNCTIONING SWITCH

(75) Inventors: Toshiyuki Iino; Hiroaki Shirai, both of Kawasaki (JP)

(73) Assignee: Fujitsu Limited, Kawasaki (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/040,854
(22) Filed: Mar. 18, 1998
(30) Foreign Application Priority Data Oct. 8, 1997 (JP) ............................................. 9-276134

(51) Int. Cl.[7] .................................................. H04J 3/00
(52) U.S. Cl. ...................................... 370/217; 370/221
(58) Field of Search ............................... 370/217, 218, 370/221, 222, 223, 224, 395, 388, 228; 340/827, 826; 395/200.69; 709/239; 379/271, 272, 273, 219, 220, 221

(56) References Cited

U.S. PATENT DOCUMENTS

| | | | | |
|---|---|---|---|---|
| 4,907,253 A | * | 3/1990 | Watrous | 379/272 |
| 5,398,236 A | * | 3/1995 | Hemmady et al. | 370/218 |
| 5,452,286 A | * | 9/1995 | Kitayama | 370/218 |
| 5,461,607 A | * | 10/1995 | Miyagi et al. | 370/218 |
| 5,471,460 A | * | 11/1995 | Tanabe | 370/218 |

FOREIGN PATENT DOCUMENTS

| | | |
|---|---|---|
| JP | 3-187529 | 8/1991 |
| JP | 3-245638 | 11/1991 |
| JP | 4-160949 | 6/1992 |

* cited by examiner

Primary Examiner—Douglas Olms
Assistant Examiner—Ken Vanderpuye
(74) Attorney, Agent, or Firm—Katten Muchin Zanis Rosenman

(57) ABSTRACT

An exchange changes a route of a transmission path to bypass a malfunctioning switch. The transmission path is formed in a switch network including a plurality of switches for transmitting communication information. The switch network is provided with a plurality of inputs and a plurality of outputs so that the transmission path is formed between one of the inputs and one of the outputs by routing the switches in the switch network. A malfunctioning switch detecting unit detects a location of the malfunctioning switch in the switch network. The route of the transmission path is changed by switching one of the inputs and outputs connected to the transmission path based on predetermined routing information which indicates a route to bypass the malfunctioning switch in relation to the inputs or the outputs of the switch network.

5 Claims, 23 Drawing Sheets

FIG.6B

INPUT TABLE(1)

| INPUT ADDRESS | MALFUNCTIONING SWITCH ADDRESS | INPUT ADDRESS AFTER CHANGE | MALFUNCTIONING SWITCH ADDRESS | INPUT ADDRESS AFTER CHANGE | MALFUNCTIONING SWITCH ADDRESS | INPUT ADDRESS AFTER CHANGE | MALFUNCTIONING SWITCH ADDRESS | INPUT ADDRESS AFTER CHANGE |
|---|---|---|---|---|---|---|---|---|
| *00 | 00 | ▨ OTHER THAN *00 | 01 | NO CHANGE | 10 | NO CHANGE | 11 | NO CHANGE |
| *01 | | NO CHANGE | | OTHER THAN *01 | | NO CHANGE | | NO CHANGE |
| *10 | | NO CHANGE | | NO CHANGE | | OTHER THAN *10 | | NO CHANGE |
| *11 | | NO CHANGE | | NO CHANGE | | NO CHANGE | | OTHER THAN *11 |

\* : DONT CARE BIT
▨ : SELECTED SWITCH

2×2 SWITCH ADDRESS

FIG.8B

INPUT TABLE(2)

| INPUT ADDRESS | MALFUNCTIONING SWITCH ADDRESS | INPUT ADDRESS AFTER CHANGE | MALFUNCTIONING SWITCH ADDRESS | INPUT ADDRESS AFTER CHANGE | MALFUNCTIONING SWITCH ADDRESS | INPUT ADDRESS AFTER CHANGE | MALFUNCTIONING SWITCH ADDRESS | INPUT ADDRESS AFTER CHANGE |
|---|---|---|---|---|---|---|---|---|
| 000 | 00 | NO CHANGE | 01 | OTHER THAN **0 | 10 | NO CHANGE | 11 | NO CHANGE |
| 001 | | NO CHANGE | | NO CHANGE | | NO CHANGE | | OTHER THAN **1 |
| 010 | | NO CHANGE | | OTHER THAN **0 | | NO CHANGE | | NO CHANGE |
| 011 | | NO CHANGE | | NO CHANGE | | NO CHANGE | | OTHER THAN **1 |
| 100 | | NO CHANGE | | OTHER THAN **0 | | NO CHANGE | | NO CHANGE |
| 101 | | NO CHANGE | | NO CHANGE | | NO CHANGE | | OTHER THAN **1 |
| 110 | | NO CHANGE | | OTHER THAN **0 | | NO CHANGE | | NO CHANGE |
| 111 | | NO CHANGE | | NO CHANGE | | NO CHANGE | | OTHER THAN **1 |

\*: DON'T CARE BIT
▨: SELECTED SWITCH

FIG.9B

OUTPUT TABLE(2)

*: DON'T CARE BIT
▨: SELECTED SWITCH

| OUTPUT ADDRESS | MALFUNCTIONING SWITCH ADDRESS | OUTPUT ADDRESS AFTER CHANGE | MALFUNCTIONING SWITCH ADDRESS | OUTPUT ADDRESS AFTER CHANGE | MALFUNCTIONING SWITCH ADDRESS | OUTPUT ADDRESS AFTER CHANGE | MALFUNCTIONING SWITCH ADDRESS | OUTPUT ADDRESS AFTER CHANGE |
|---|---|---|---|---|---|---|---|---|
| 000 | 00 | OTHER THAN 0** | 01 | NO CHANGE | 10 | NO CHANGE | 11 | NO CHANGE |
| 001 |  | OTHER THAN 0** |  | NO CHANGE |  | NO CHANGE |  | NO CHANGE |
| 010 |  | OTHER THAN 0** |  | NO CHANGE |  | NO CHANGE |  | NO CHANGE |
| 011 |  | OTHER THAN 0** |  | NO CHANGE |  | NO CHANGE |  | NO CHANGE |
| 100 |  | NO CHANGE |  | OTHER THAN 1** |  | NO CHANGE |  | NO CHANGE |
| 101 |  | NO CHANGE |  | OTHER THAN 1** |  | NO CHANGE |  | NO CHANGE |
| 110 |  | NO CHANGE |  | OTHER THAN 1** |  | NO CHANGE |  | NO CHANGE |
| 111 |  | NO CHANGE |  | OTHER THAN 1** |  |  |  |  |

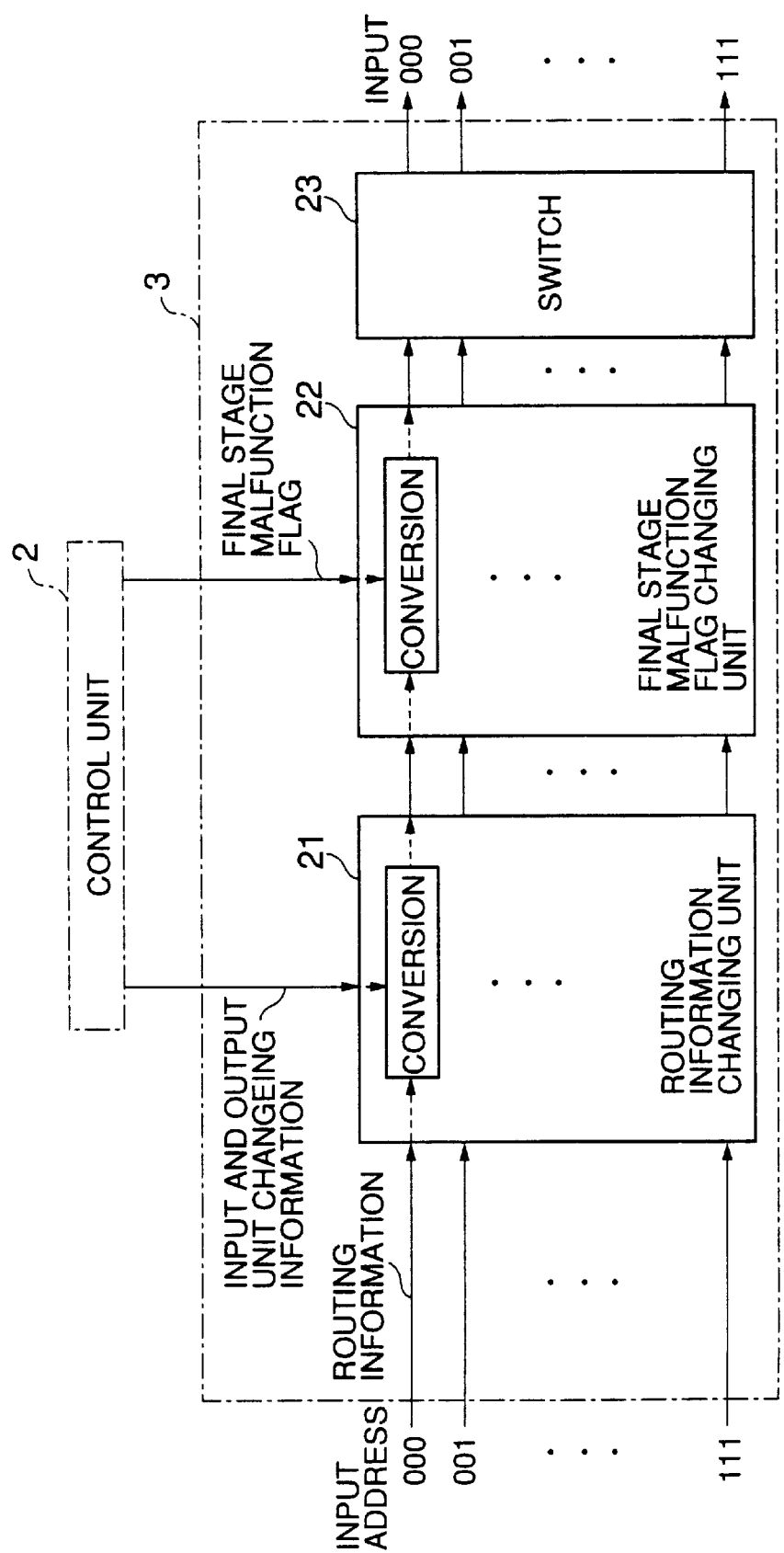

FRAM FORMAT IN INPUT SWITCHING UNIT

FRAM FORMAT IN OUTPUT SWITCHING UNIT

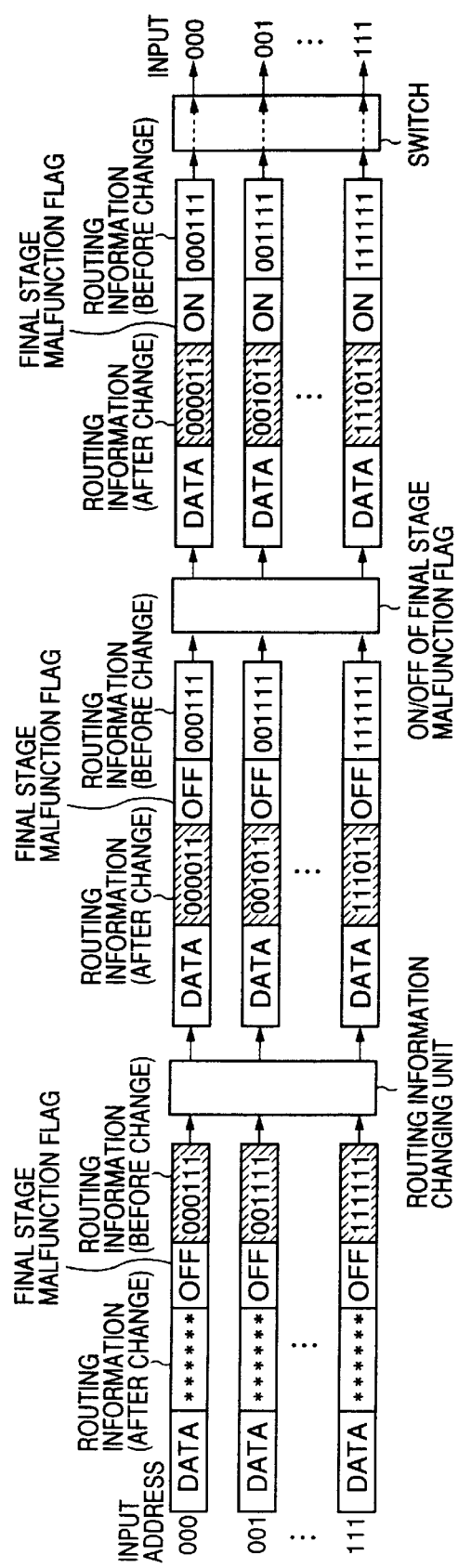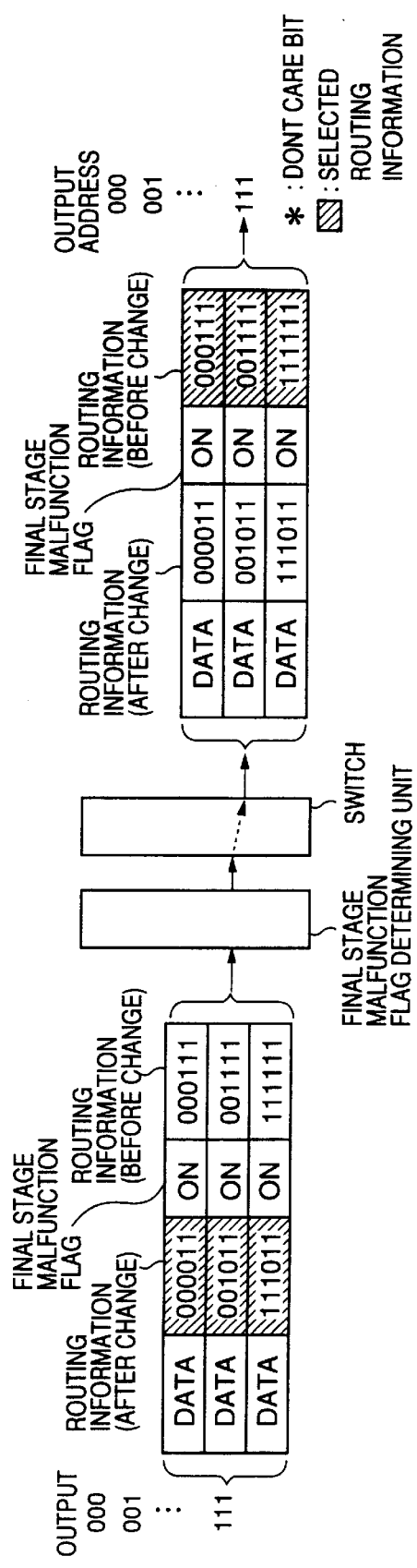

ROUTING FROM "000" TO "111" (BEFOR CHANGE)

ROUTING FROM "000" TO "111" (AFTER CHANGE)

ROUTING FROM "000" TO "111" (BEFOR CHANGE)

ROUTING FROM "000" TO "111" (AFTER CHANGE)

ROUTING FROM "000" TO "111" (BEFOR CHANGE)

ROUTING FROM "000" TO "111" (AFTER CHANGE)

ROUTING FROM "000" TO "111" (BEFOR CHANGE)

ROUTING FROM "000" TO "111" (AFTER CHANGE)

EXCHANGE FOR CHANGING A ROUTE OF A TRANSMISSION PATH TO BYPASS A MALFUNCTIONING SWITCH

BACKGROUND OF THE INVENTION

1. Field of the Invention

The present invention generally relates to an exchange and, more particularly, to an exchange which changes a route of a transmission path, when a malfunction occurs in one of a plurality of switches, so as to bypass the malfunctioning switch.

In an exchange or a transmission apparatus which communicates information including audio data and image data, a switch network is provided with a plurality of inputs and outputs so that any one of the inputs can be connected to any one of the outputs so as to arbitrarily change a route of a communication path formed in the switch network.

2. Description of the Related Art

A description will now be given of a conventional method for avoiding influence of a malfunction occurring in one of a plurality of switches which constitute a switch network in an exchange.

FIGS. 1, 2 and 3 show a first, second and third conventional exchange, respectively.

The first conventional exchange shown in FIG. 1 comprises a working switch network 101, a spare switch network 102 having the same structure as the working switch network 101, an input switching unit 103 and an output switching unit 104. The working switch network 101 comprises a plurality of switches, and has a plurality of inputs and a plurality of outputs. The input switching unit 103 and the output switching unit 104 change a transmission path formed through the exchange so that the transmission path is formed in the spare switch network 102 instead of the working switch network 101 when a malfunction occurs in one of the switches in the working switch network 101 which is actually being used.

When a malfunction occurs in one of the switches constituting the working switch network 101, the first conventional exchange bypasses the malfunctioning switch by switching the actually used switch network from the working switch network 101 to the spare switch network 102. This switching operation is performed by the input switching unit 103 and the output switching unit 104. Transmission paths formed after the switching operation are also formed in the spare switch network 102.

The second conventional exchange shown in FIG. 2 comprises a switch network 111, an input switching unit 112, an output switching unit 113 and a header changing table circuit 114. The switch network 111 comprises a plurality of switches and a plurality of spare switches reserved for spare use. The switch network 111 has a plurality of inputs and a plurality of outputs, and also has a plurality of spare inputs and a plurality of spare outputs. The input switching unit 112 and the output switching unit 113 change a route of a transmission path formed through the exchange so that the transmission path is formed between one of the spare inputs and one of the spare outputs when a malfunction occurs in one of the switches included in the transmission path in the switch network. The header changing table circuit 114 changes input address information, which is included in communication information to be transmitted, to input address information of one of the spare inputs.

When a malfunction occurs in one of the switches in the switch network 111, the second conventional exchange bypasses the malfunctioning switch by changing a route of the transmission path including the malfunctioning switch to a route formed between one of the spare switches and one of the spare inputs.

The third conventional exchange shown in FIG. 3 comprises a switch network 121 including a plurality of switches. The switch network 121 has a plurality of inputs and a plurality of outputs. When a malfunction occurs in one of the switches constituting the switch network 121, the malfunctioning switch is detected so that a transmission path routing the malfunctioning switch is changed to a transmission path routing a spare switch instead of the malfunctioning switch.

However, each of the above-mentioned conventional exchanges has the following problems.

In the first conventional exchange, since a detection of the malfunctioning switch in the actually used working switch network 101 is not performed, a transmission path routing the malfunctioning switch cannot be distinguished. Thus, all transmission paths including normal transmission paths must be switched to transmission paths formed in the spare switch network 102 when a malfunction occurs in one of the switches in the working switch network 101.

In the first, second and third conventional exchanges, since the spare switch network or the spare switch must be reserved for spare use which is not used in a normal condition, weight and size of the entire system is increased and also manufacturing cost of the exchange is increased.

SUMMARY OF THE INVENTION

It is a general object of the present invention to provide an exchange in which the above-mentioned problems are eliminated.

A more specific object of the present invention is to provide an exchange in which, when a malfunction occurs in one of a plurality of switches, a transmission path bypassing the malfunctioning switch can be formed in the absence of a spare switch in the exchange so as to decrease weight and size of the entire system.

In order to achieve the above-mentioned objects, there is provided according to the present invention an exchange setting a transmission path for transmitting communication information through a switch network comprising a plurality of switches, the switch network provided with a plurality of inputs and a plurality of outputs so that the transmission path is formed between one of the inputs and one of the outputs by routing the switches in the switch network, the exchange changing a route of the transmission path when a malfunction occurs in one of the switches included in the transmission path so as to bypass the malfunctioning switch, the exchange comprising:

a malfunctioning switch detecting unit detecting a location of the malfunctioning switch in the switch network; and changing means for changing the route of the transmission path by switching one of the inputs and outputs connected to the transmission path based on predetermined routing information so as to bypass the malfunctioning switch.

According to the above-mentioned invention, when a malfunction occurs in one of the switches constituting the switch network, the location of the malfunctioning switch is detected and the location information is supplied to the changing means. The location information may include an address of the malfunctioning switch and information indicating a position of the malfunctioning switch with respect to the inputs and outputs of the switch network. For example, if the switches in the switch network are arranged in a matrix, the location information may include indication of a column (stage) in which the malfunctioning switch is included. When the changing means receives the location information, the changing means changes the route of the transmission path by changing one of the inputs which is connected to the transmission path or changing one of the outputs connected to the transmission path. That is, the input or the output connected to the transmission path is changed to another input or output based on the routing information which indicates a route which bypasses the malfunctioning switch. That is, the route of the transmission path can be changed to a route which bypasses the malfunctioning switch by merely changing the input or output of the switch network.

Accordingly, the exchange according to the present invention discriminate the transmission path including the malfunctioning switch, and the route of the transmission path is changed by changing the input or the output of the switch network based on the location of the malfunctioning switch. Thus, the exchange according to the present invention does not need a spare switch which is not used when the exchange is operated in a normal condition. Therefore, the weight and size of the entire system is reduced which is advantageous for reducing manufacturing cost.

In the exchange according to the present invention, the changing means may comprise:

a storing unit which stores table information indicating a plurality of routes each of which bypasses one of the switches in the switch network, each of the routes being indicated in relation to one of the inputs and outputs of the switch network; and a selecting unit selecting one of the routes indicated in the table information so as to change the route of the transmission path to bypass the malfunctioning switch.

Accordingly, if the location of the malfunctioning switch is detected, a route which bypasses the malfunctioning switch can be obtained from the table information in relation to the input or the output of the switch network.

In one embodiment according to the present invention, the changing means may comprise:

an input switching unit switching the input of the switch network;

an output switching means switching the output of the switch network; and input and output selecting means for selecting one of the input switching unit and the output switching unit so that the changing means changes the route of the transmission path by the selected one of the input switching unit and the output switching unit.

The input and output selecting means may select the input switching unit when the malfunctioning switch is one of the switches directly connected to the input switching unit. Additionally, the input and output selecting means may select the output switching unit when the malfunctioning switch is one of the switches directly connected to the output switching unit.

Additionally, the input and output selecting means may select the input switching unit when the malfunctioning switch is one of the switches other than the switches directly connected to one of the input switching unit and the output switching unit. Alternately, the input and output selecting means selects the output switching unit when the malfunctioning switch is one of the switches other than the switches directly connected to one of the input switching unit and the output switching unit.

Other objects, features and advantages of the present invention will become more apparent from the following detailed description when read in conjunction with the accompanying drawings.

BRIEF DESCRIPTION OF THE DRAWINGS

FIG. 6B is an illustration for explaining input table (1) information.

FIG. 8B is an illustration for explaining input table (2) information;

FIG. 9B is an illustration for explaining output table (2) information;

FIG. 10 is a block diagram of an input switching unit shown in FIG.4;

FIG. 13A is an illustration for explaining an operation of an input switching unit shown in FIG. 10 when a malfunction occurs in one of the switches in the final stage; FIG. 13B is an illustration for explaining an operation of an output switching unit shown in FIG. 11 when a malfunction occurs in one of the switches in the final stage;

DETAILED DESCRIPTION OF THE PREFERRED EMBODIMENTS

A description will now be given of an exchange according to a first embodiment of the present invention.

Figure 1:
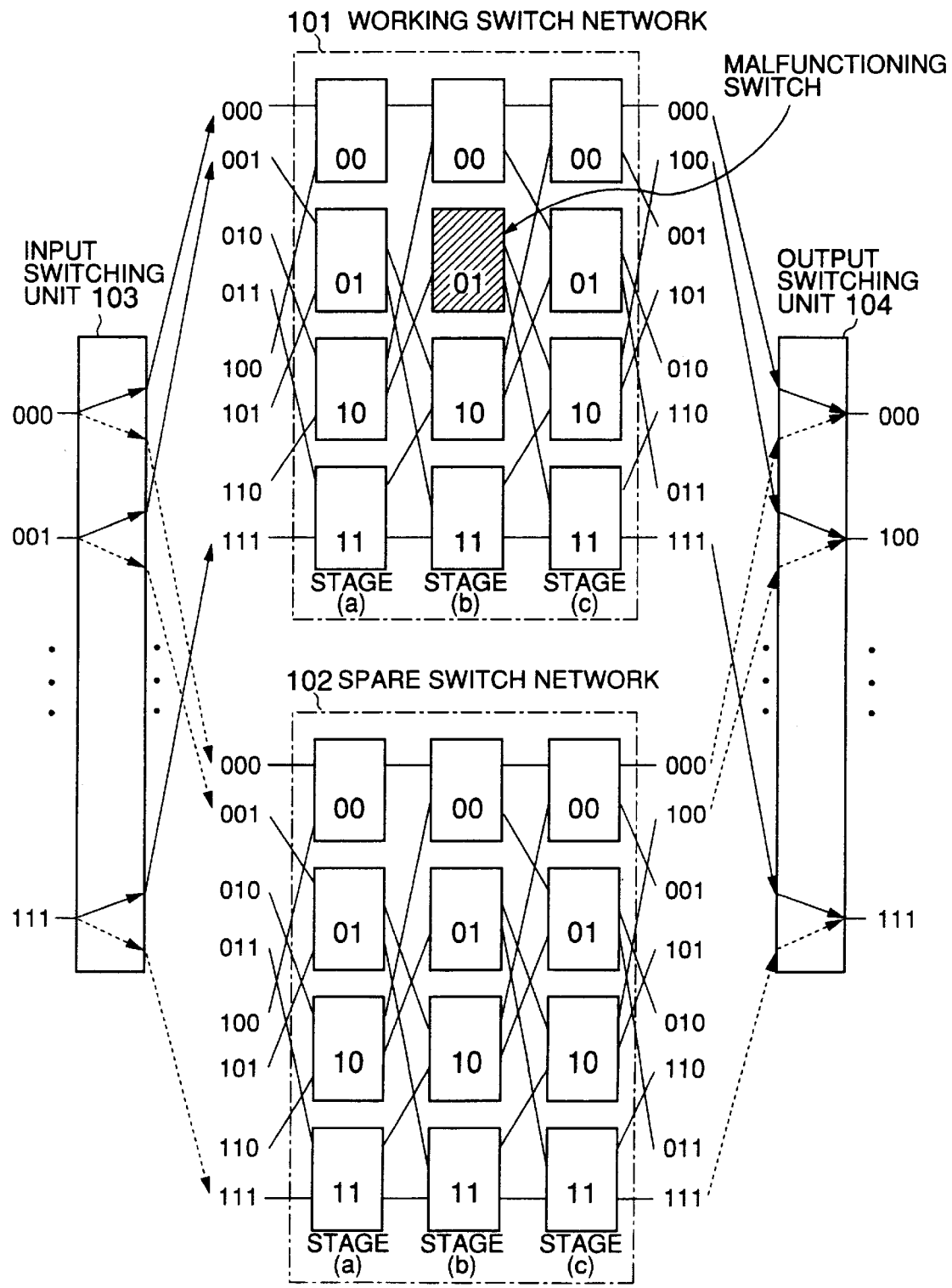
FIG. 1 is a block diagram of a first conventional exchange.
Figure 2:
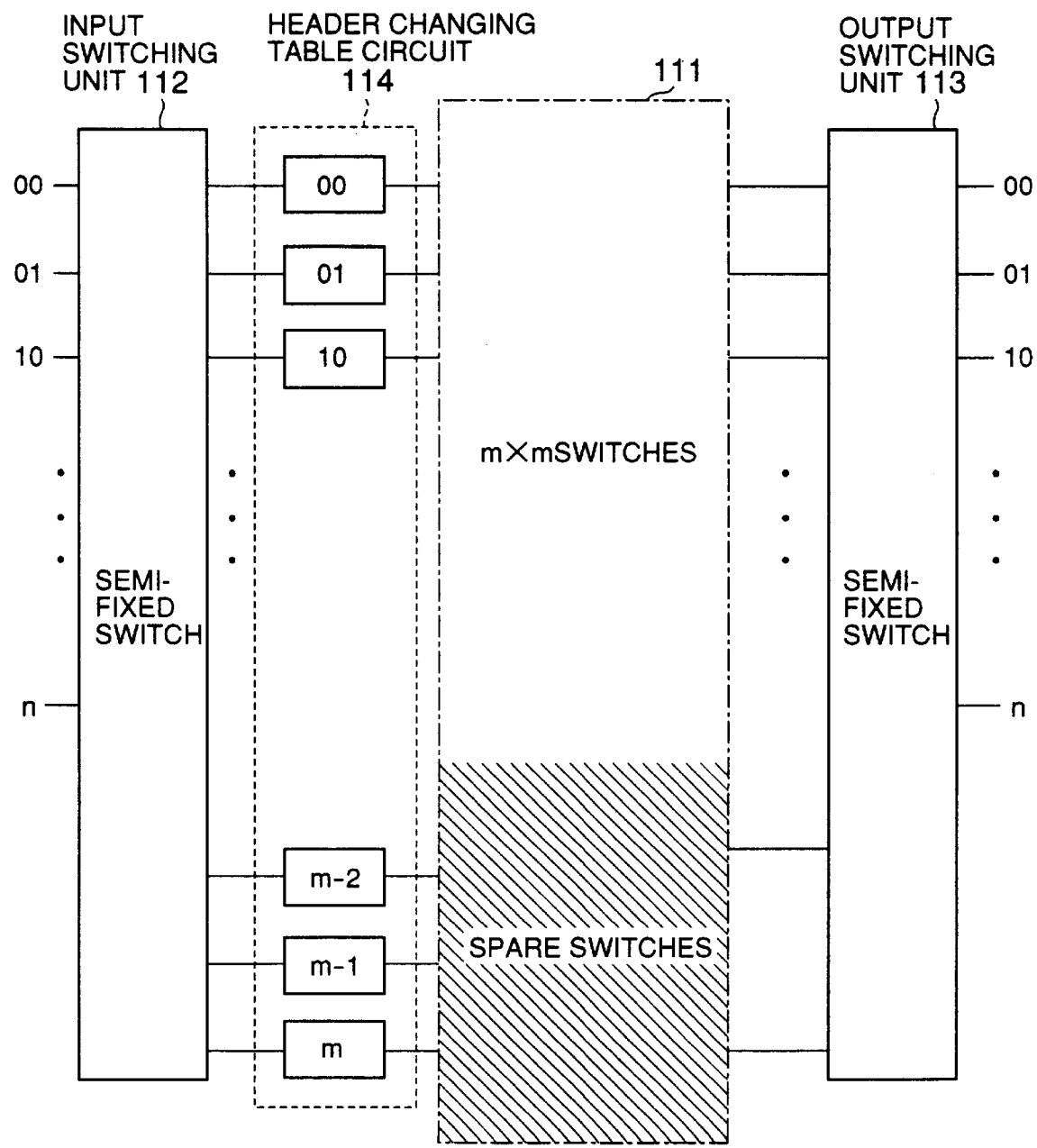
FIG. 2 is a block diagram of a second conventional exchange.
Figure 3:
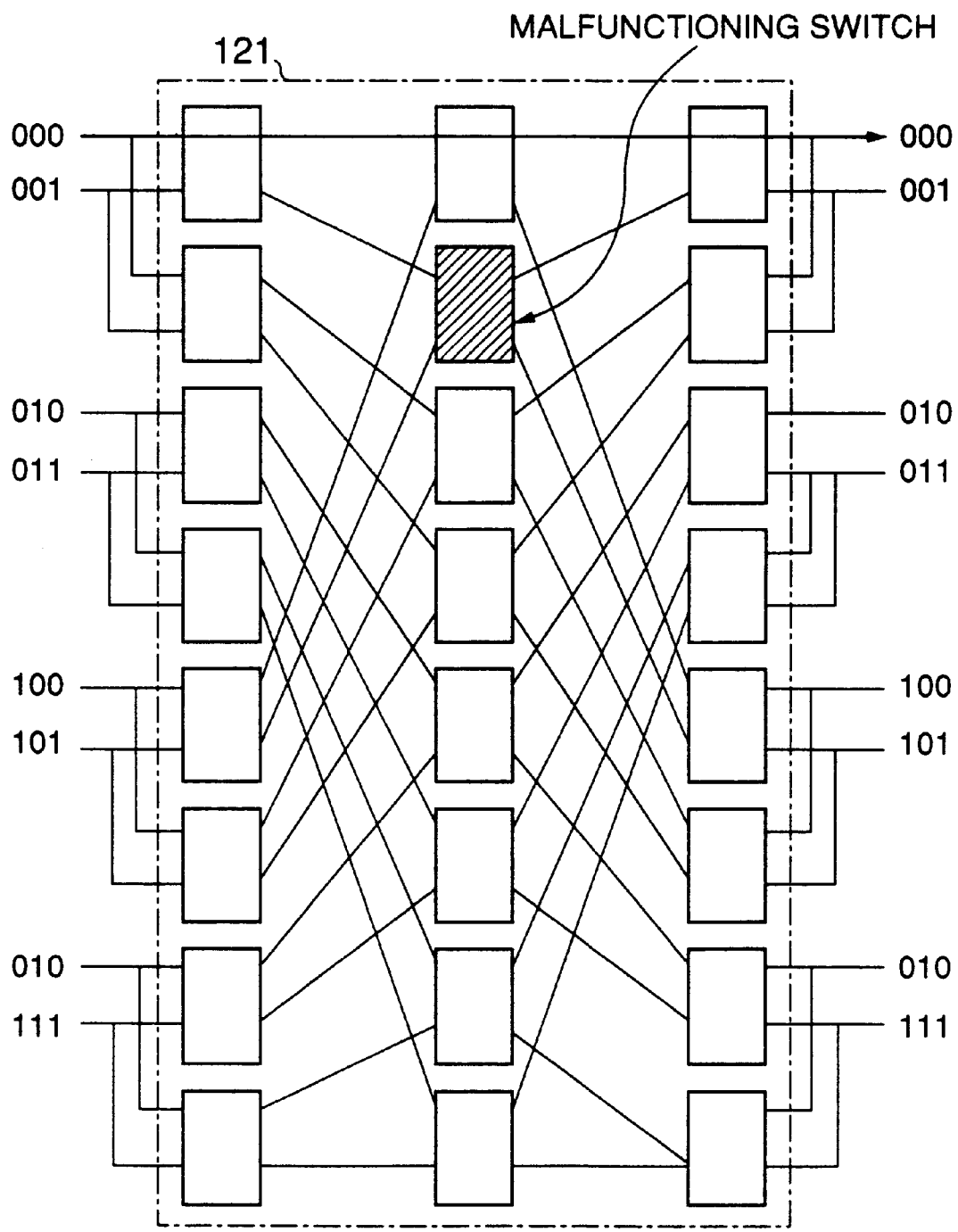
FIG. 3 is a block diagram of a third conventional exchange.
Figure 4:
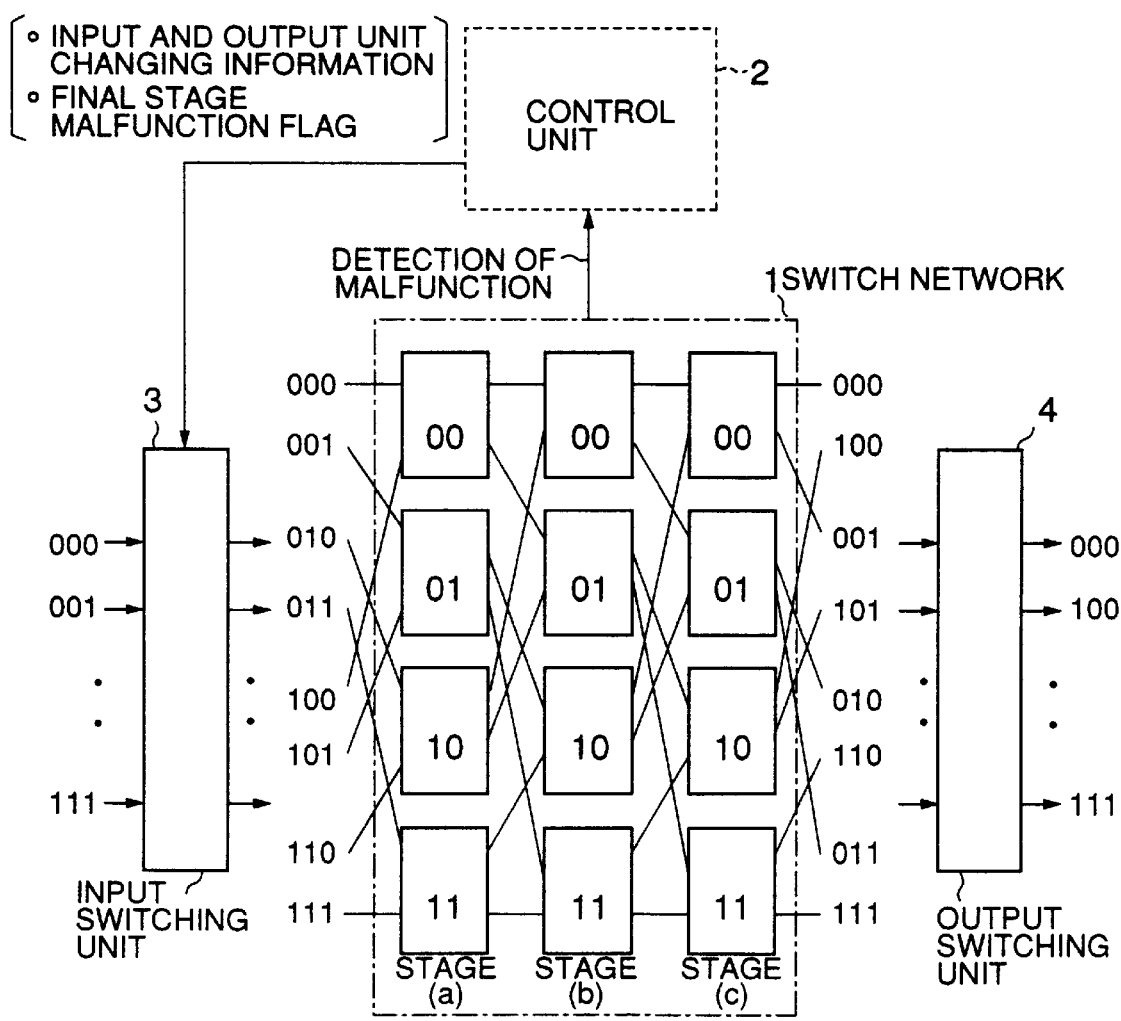
FIG. 4 is a block diagram of an exchange according a first embodiment of the present invention.

FIG. 4 is a block diagram of the exchange according to the first embodiment of the present invention. The exchange shown in FIG. 4 comprises a switch network 1, a control unit 2, an input switching unit 3 and an output switching unit 4. When a malfunction occurs in one of a plurality of switches in the switch network 1, the exchange switches a transmission path so as to bypass the malfunctioning switch.

The switch network 1 of the present embodiment comprises twelve (12) switches each having two (2) inputs and two (2) outputs so as to constitute a switch network having eight (8) inputs and eight (8) outputs. For example, the eight (8) inputs of the switch network 1 are provided with eight (8) input addresses from "000" to "111", and eight (8) outputs are provided with eight (8) output addresses from "000" to "111". In the switch network 1, the switches are arranged in a 3×4 matrix. Four (4) switches in the first stage (first column) are connected to the inputs of the switch network 1. The first stage is referred to as a malfunction stage (a). Four (4) switches in the final stage (third column) are connected to the outputs of the switch network 1. The final stage is referred to as a malfunction stage (c). Four (4) switches in the intermediate stage (second column) are not connected with either the inputs or the outputs. The intermediate stage is defined as a malfunction stage (b). Additionally, the switches in the first row (the uppermost row) are given a switch address "00"; the switches in the second row are given a switch address "01"; the switches in the third row are given a switch address "10"; the switches in the fourth row (the lowermost row) are given a switch address "11".

The switch network 1 has a function to change a route of a transmission path formed in the switch network 1 based on predetermined routing information of a previously set route and location information of a malfunctioning switch. Although the switch network 1 of the present embodiment comprises twelve (12) switches and has eight (8) inputs and eight (8) outputs, the number of switches, the number of inputs and the number of outputs are not limited to, those numbers.

The control unit 2 serves as a changing means for changing a route of a transmission path formed in the switch network 1. That is, when a malfunction occurs in the switch network 1, the control unit 2 sets a final stage malfunction flag and produces input and output unit changing information. The final stage malfunction flag is set for selecting one of the ways to bypass the malfunctioning switch by either changing the input address or output address. The selection by the controller is performed based on address information of the malfunctioning switch and information of the malfunction stage in which the malfunction switch is included. The input and output unit changing information is used for changing a transmission path in the switch network 1 so as to bypass the malfunctioning switch.

The input switching unit 3 serves as an input switching means of the changing means. That is, when a malfunction occurs in the switch network 1, the input switching unit 3 switches a path to the inputs of the switch network 1 based on the input and output unit changing information produced by the control unit 2.

The output switching unit 4 serves as an output switching means of the changing means. That is, when a malfunction occurs in the switch network 1, the input switching unit 3 switches a path from the outputs of the switch network 1 based on the final stage malfunction flag set by the control unit 2.

A description will now be given, with, reference to FIG. 5, of the control unit 2 shown in FIG. 4 in more detail.

Figure 5:
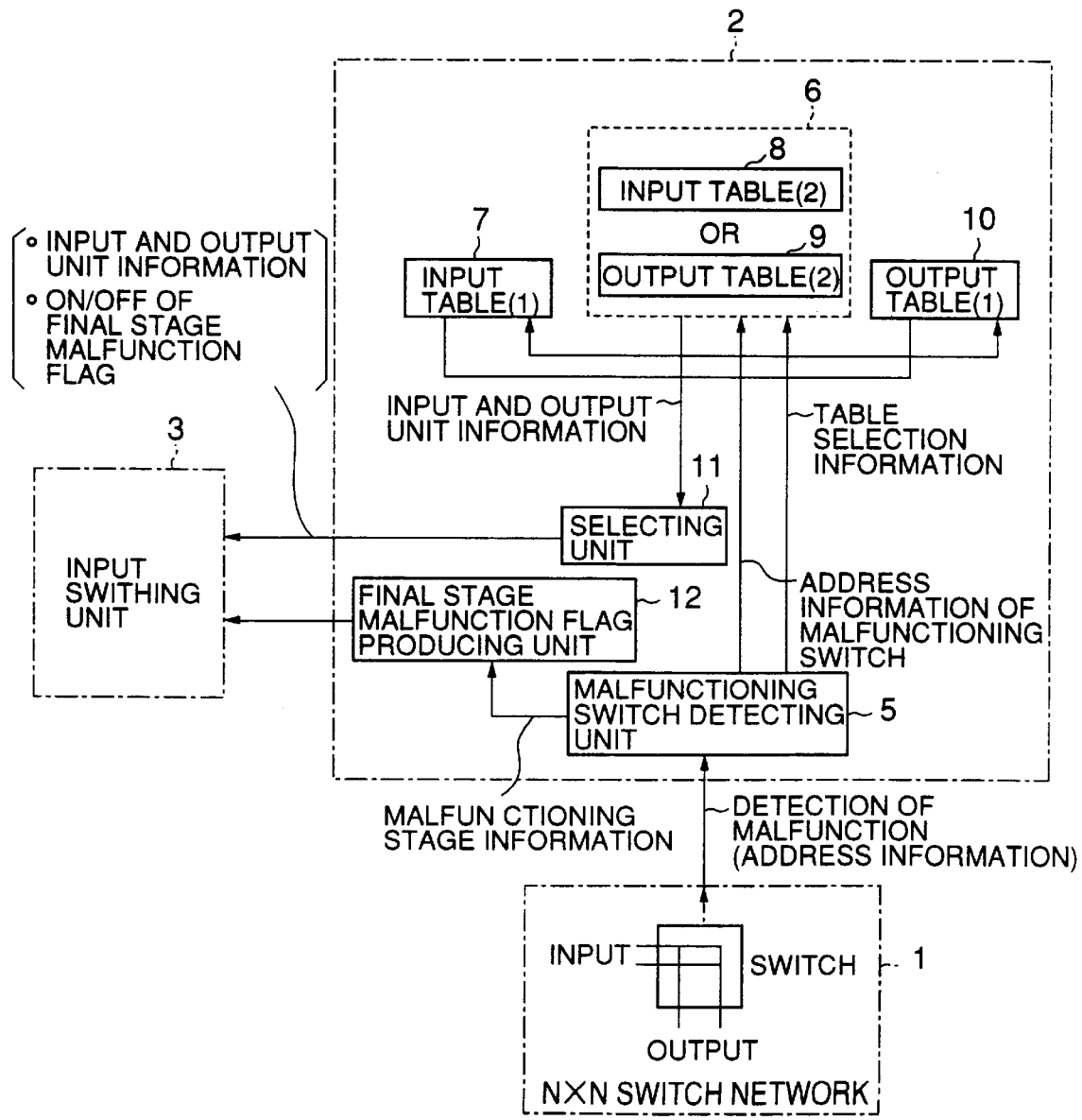
FIG. 5 is a block diagram of a control unit shown in FIG. 4.

As shown in FIG. 5, the control unit 2 comprises a malfunctioning switch-detecting unit 5, an input and output table storing unit 6, an input table (1) storing unit 7, an output table (1) storing unit 10, a selecting unit 11 and a final stage flag producing unit 12.

The malfunctioning switch detecting unit 5 serves as a discriminating means for discriminating a switch in which a malfunction occurs. That is, when a malfunction occurs in one of the switches in the switch network 1, the malfunctioning switch detecting unit 5 detects the malfunctioning switch.

The input table (1) storing unit 7 serves as a storing means for storing an input table (1) information as predetermined routing information. The input table (1) information is referred to when the malfunctioning switch is included in the malfunction stage (a) (the first stage) of the switch network 1 so as to change a transmission path to bypass the malfunctioning switch. That is, the input table (1) storing unit 7 stores the input table (1) information which indicates each switch in the switch network 1 in relation to transmission paths each of which bypasses each switch in the switch network 1.

The output table (1) storing unit 10 serves as a storing means for storing an output table (1) information as predetermined routing information. The output table (1) information is referred to when the malfunctioning switch is included in the malfunction stage (c) (the final stage) of the. switch network 1 so as to change a transmission path to bypass the malfunctioning switch. That is, the output table (1) storing unit 10 stores the output table (1) information which indicates each switch in the switch network 1 in relation to transmission paths each of which bypasses each switch in the switch network 1.

The input and output table storing unit 6, which serves as a storing means, comprises at least one of an input table (2) information storing unit 8 for storing an input table (2) information and an output table (2) information storing unit 9 for storing an output table (2) information. The input table (2) information or the output table (2) information is referred to when a malfunctioning switch is included in the malfunction stage (b) (the intermediate stage). The input table (2) information and the output table (2) information serves a function similar to the input table (1) information and the output table (1) information.

The selecting unit 11 serves as a path selecting means for selecting a transmission path which bypasses a malfunctioning switch. That is, when a malfunction occurs in one of the switches in the switch network 1, the selecting unit 11 selects a transmission path which bypasses the malfunctioning switch based on the input table (1) information, the output table (1) information, the input table (2) information and the output table (2) information.

The final stage malfunction flag producing unit .12 sends a notification to the input switching unit 3 so as to set the final stage malfunction flag to "ON" when switching is performed by the output switching unit 4.

A description will now be given, with reference to FIGS. 6A, 6B and 6C, of an operation of the control unit 2 when the input table (1) information stored in the input table (1) storing unit 7 is referred to.

Figure 6A:
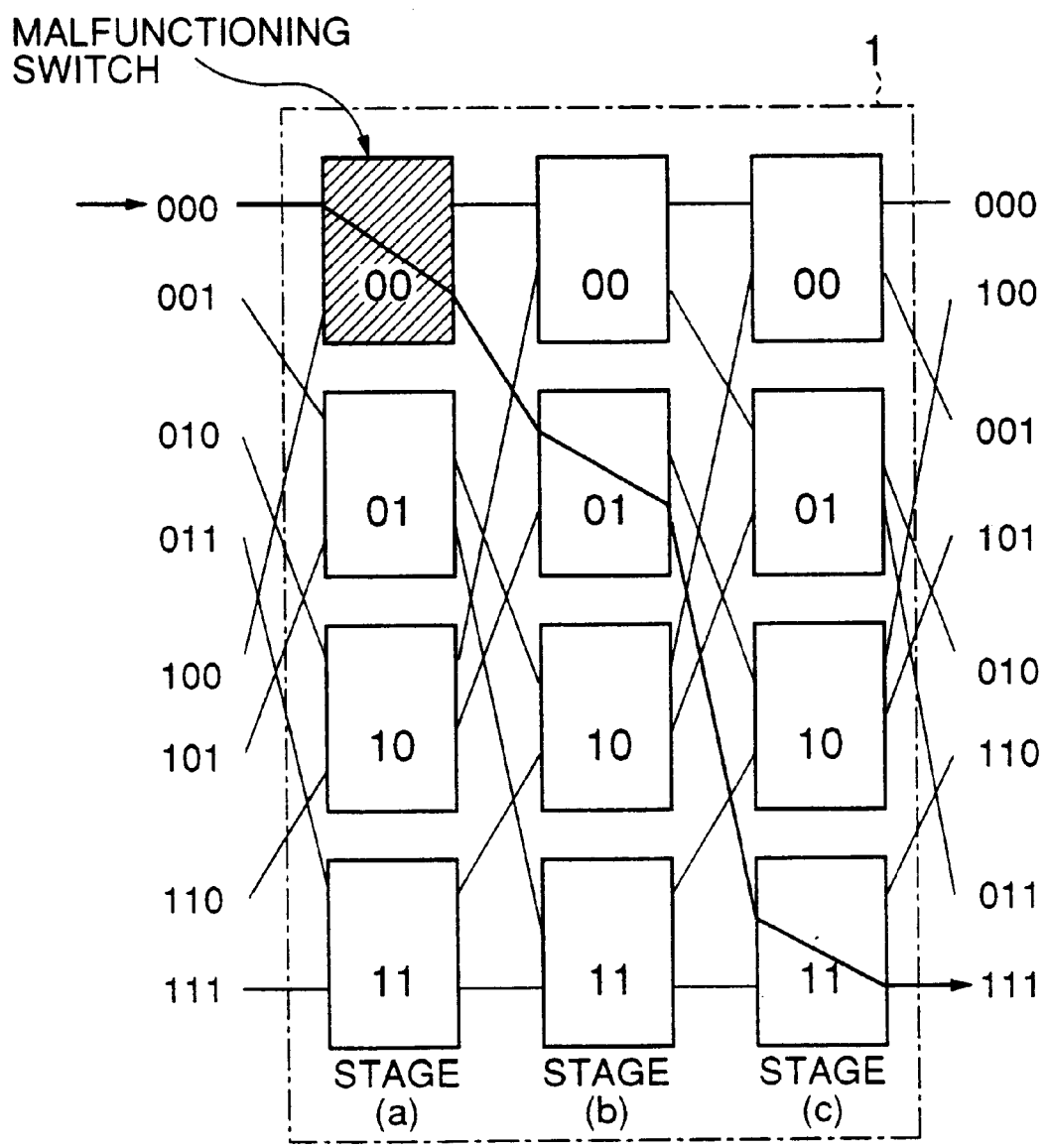
FIG. 6A is an illustration of a switch network for explaining an operation of the control unit when a malfunction occurs in a switch included in a first stage.
Figure 6C:
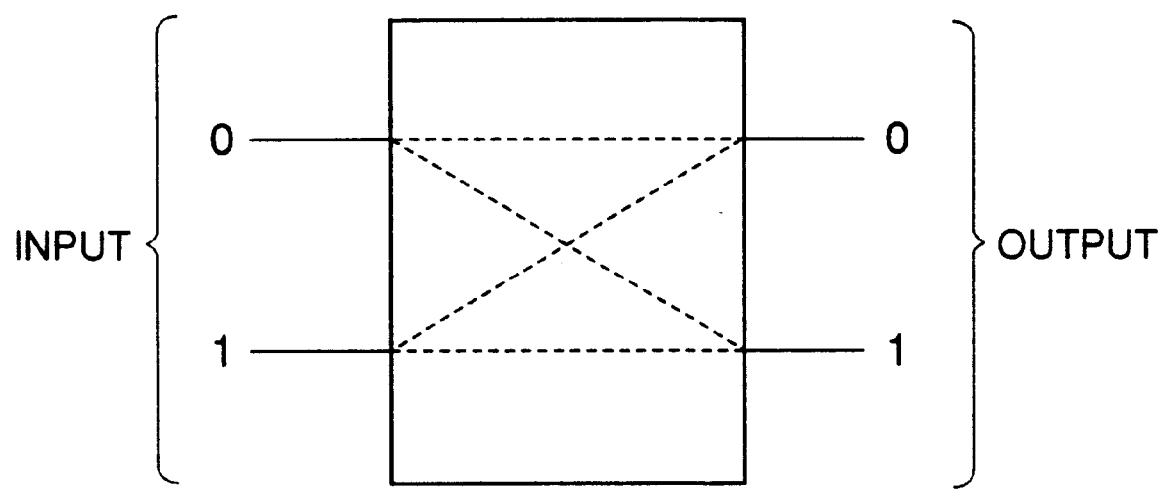
FIG. 6C is an. illustration for explaining each switch included in the switch network shown in FIG. 4.

FIG. 6A shows a case in which a malfunction occurs in a switch having a switch address "00" in the malfunction stage (a). In the case shown in FIG. 6A, an original routing information is "000111" which indicates a transmission path routing from the input having the address "000" to the output having the address "111" (indicated by a bold solid line in FIG. 6A). Each of the switches constituting the switch network 1 has a 0-input terminal, a 0-output terminal, a 1-input terminal and a 1-output terminal as shown in FIG. 6C. The input address "000" indicates the input terminals of the malfunction stages (a), (b) and (c), respectively. The output address "111" indicates the output terminals of the malfunction stages (a), (b) and (c), respectively.; Accordingly, communication information input to the input address "000" of the switch network 1 is first input to the 0-input terminal of the switch having the switch address "00" in the malfunction stage (a), and output from the 1output terminal of the same switch. Then, the communication information is input to the 0-input terminal of the switch having the switch address "01" in the malfunction stage (b), and output from the 1-output terminal of the same switch. Thereafter, the communication information is input to the 0-input terminal of the switch having the switch address "11" in the malfunction stage (c), and output from the 1-output terminal of the same switch. Finally, the communication information is output from the output address "111" of the switch network 1.

When the malfunctioning switch detecting unit 5 detects the malfunctioning switch, the selecting unit 11 refers to the input table (1) information stored in the input table (1) storing unit 7 since the malfunctioning switch is included in the malfunction stage (a) (the first stage). The input table (1) information provides the information as shown in FIG. 6B. Accordingly, the control unit 2 refers to, as input and output information, a case in which the input address is "000" and the switch address "00" of the malfunctioning switch (indicated by hatched portion of FIG. 6B). In this case, an input address after change indicates other than "*00". This means that the selecting unit 11 should select input addresses other than the input addresses "000" and "100" so as to change a transmission path to bypass the malfunctioning switch. Accordingly, for example, the malfunctioning switch can be bypassed if the, routing information supplied to the input switching unit 3 is changed to "001111". It should be noted that the routing information is not limited to "001111".

A description will now be given, with reference to FIGS. 7A and 7B, of an operation of the control unit 2 when the output table (1) information stored in the output table (1) storing unit 10 is referred to.

Figures 7A, 7B:
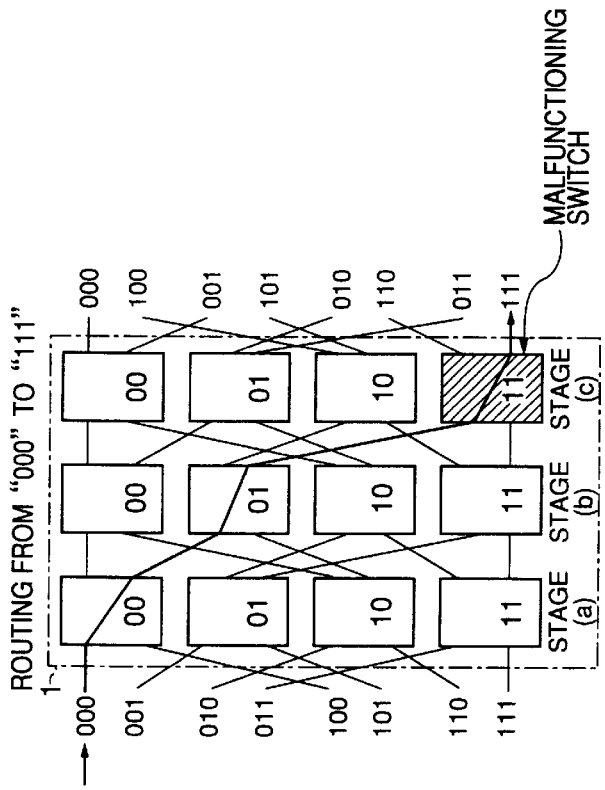
FIG. 7A is an illustration of the switch network for explaining an operation of the control unit when a malfunction occurs in a switch included in a final stage.
FIG. 7B is an illustration for explaining output table (1) information.

FIG. 7A shows. a case in which a malfunction occurs in a switch having a switch address "11" in the malfunction stage (c). In the case shown in FIG. 7A, an original routing information is "000111" which indicates a transmission path routing from the input having the address "000" to the output having the address "111" (indicated by a bold solid line in FIG. 7A).

When the malfunctioning switch detecting unit 5 detects the malfunctioning switch, the selecting unit 11 refers to the output table (1) information stored in the output table (1) storing unit 10 since the malfunctioning switch is included in the malfunction stage (c) (the final stage). The output table (1) information provides the information as, shown in FIG. 7B. Accordingly, the control unit 2 refers to, as input and output information, a case in which the output address is "111" and the switch address "11" of the malfunctioning switch (indicated by hatched portion of FIG. 7B). In this case, an output address after change indicates other than "11*". This means that the selecting unit 11 should select output addresses other than the output addresses "111" and "110" so as to change a transmission path to bypass the malfunctioning switch. Accordingly, for example, the malfunctioning switch can be bypassed if the routing information supplied to the input switching unit 3 is changed to "000011". It should be noted that the routing information is not limited to "000011".

A description will now be given, with reference to FIGS. 8A and 8B, of an operation of the control unit 2 when the input table (2) information stored in the input table (2) storing unit 8 is referred to.

Figure 8A:
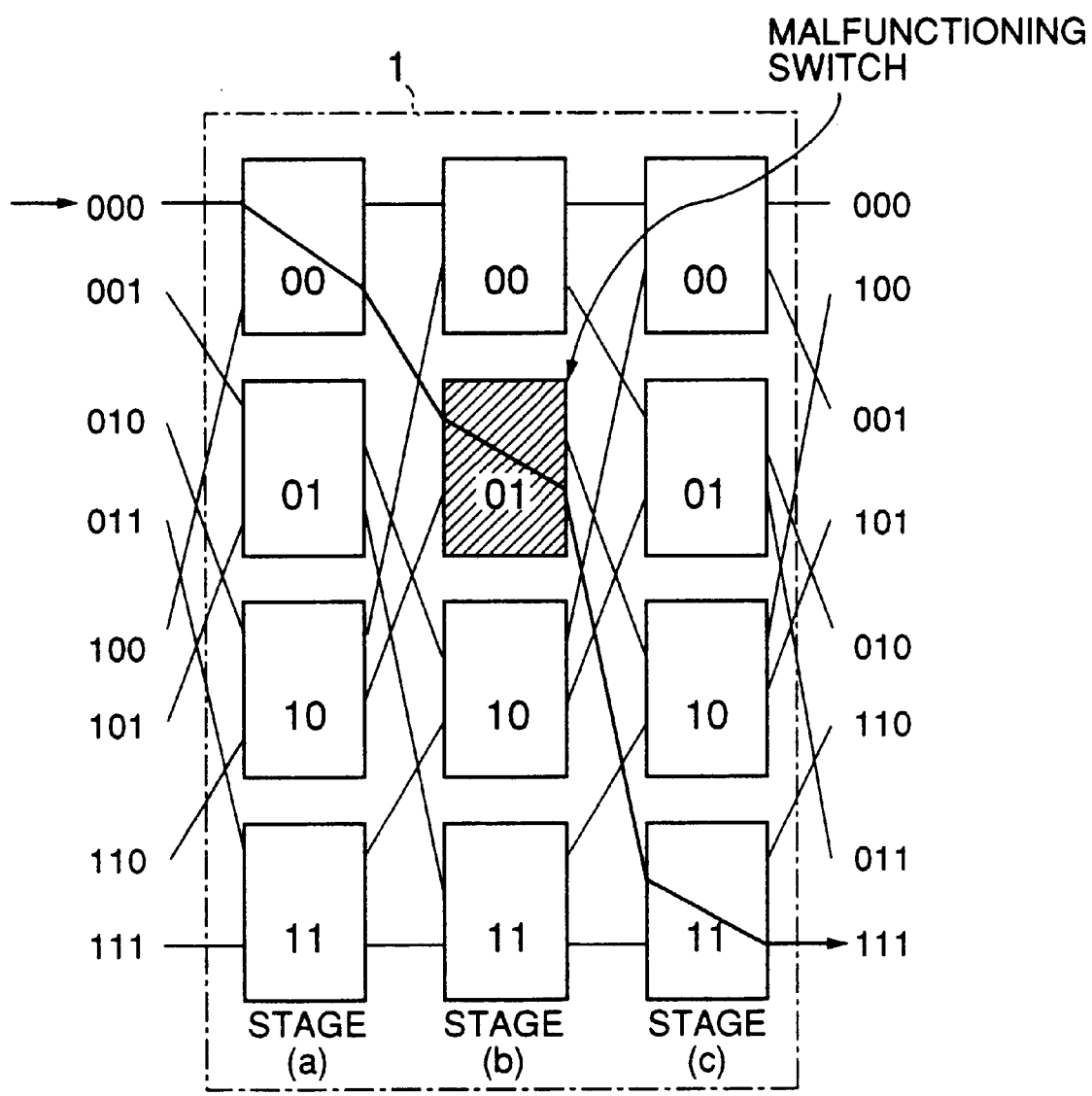
FIG. 8A is an illustration of the switch network for explaining an operation of the control unit when a malfunction occurs in a switch included in an intermediate stage.

FIG. 8A shows a case in which a malfunction occurs in a switch having a switch address "01" in the malfunction stage (b). In the case shown in FIG. 7A, an original routing information is "000111" which indicates a transmission path routing from the input having the address "000" to the output having the address "111" (indicated by a bold solid line in FIG. 8A).

When the malfunctioning switch detecting unit 5 detects the malfunctioning switch, the selecting unit 11 refers to the input table (2) information stored in the input table (2) storing unit 8 since the malfunctioning switch is included in the malfunction stage (b) (the intermediate stage). The information table (2) information provides the information as shown in FIG. 8B. Accordingly, the control unit 2 refers to, as input and output information, a case in which the input address is "000" and the switch address "01" of the malfunctioning switch (indicated by hatched portion of FIG. 8B). In this case, an input address after change indicates other than "**1". This means that the selecting unit 11 should select input addresses other than the input addresses "000", "010", "100" and "110" so as to change a transmission path to bypass the malfunctioning switch. Accordingly, for example, the malfunctioning switch can be bypassed if the routing information supplied to the input switching unit 3 is changed to "001111". It should be noted that the routing information is not limited to "001111".

A description will now be given, with reference to FIGS. 9A and 9B, of an operation of the control unit 2 when the output table (2) information stored in the output table (2) storing unit 9 is referred to.

Figure 9A:
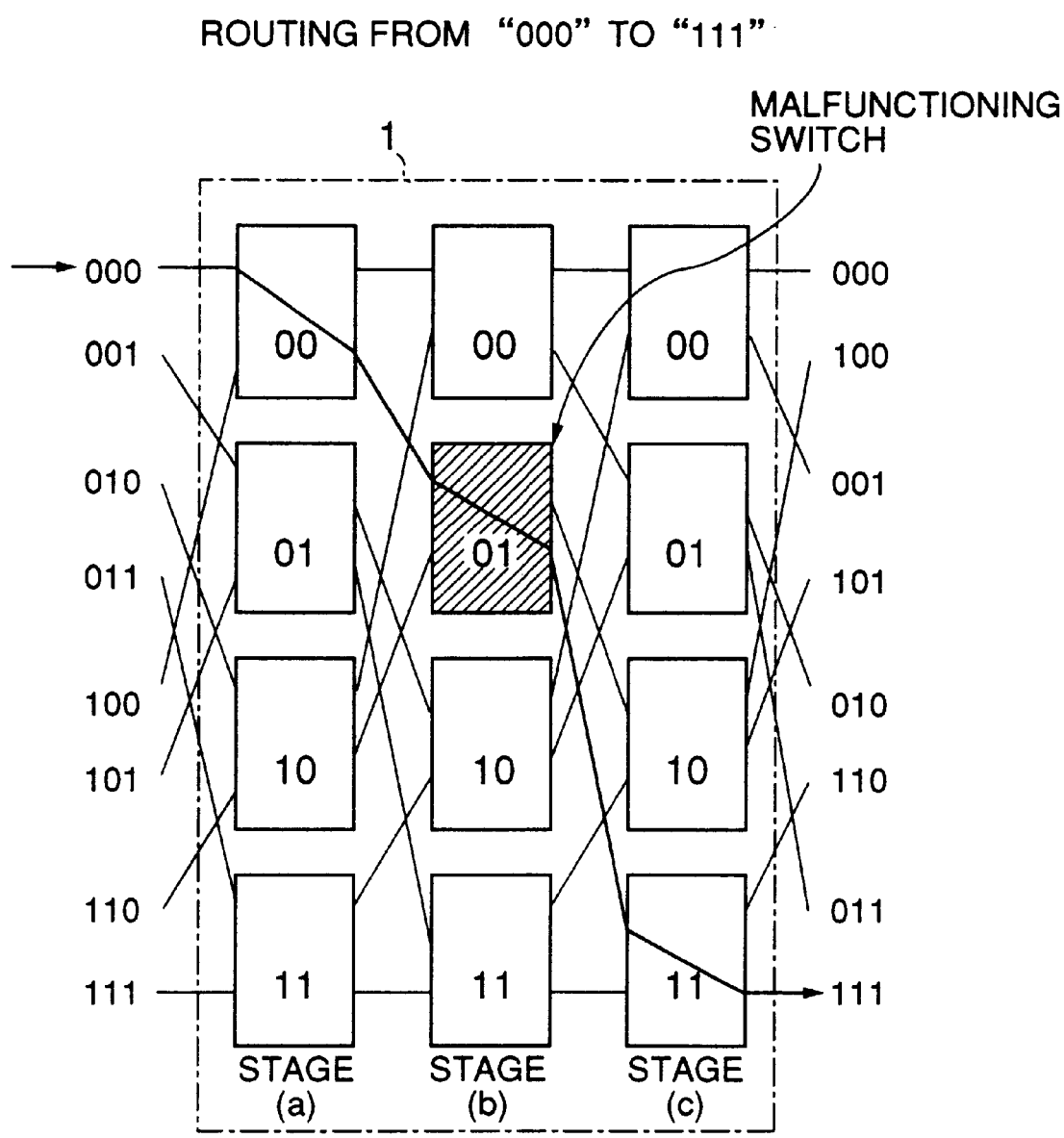
FIG. 9A is an illustration of the switch network for explaining an operation of the control unit when a malfunction occurs in a switch included in the intermediate stage.

FIG. 9A shows a case in which a malfunction occurs in a switch having a switch address "01" in the malfunction stage (c). In the case shown in FIG. 9A, an original routing information is "000111" which indicates a transmission path routing from the input having the address "000" to the output having the address "111" (indicated by a bold solid line in FIG. 9A).

When the malfunctioning switch detecting unit 5 detects the malfunctioning switch, the selecting unit 11 refers to the output table (2) information stored in the output table (2) storing unit 9 since the malfunctioning switch is included in the malfunction stage (b) (the intermediate stage). The output table (2) information provides the information as shown in FIG. 9B. Accordingly, the control unit 2 refers to, as input and output information, a case in which the output address is "111" and the switch address "01" of the malfunctioning switch (indicated by hatched portion of FIG. 9B). In this case, an output address after change indicates other than "1**". This means that the selecting unit 11 should select output addresses other than the output addresses "111", "110", "101" and "100" so as to change a transmission path to bypass the malfunctioning switch. Accordingly, for example, the malfunctioning switch can be bypassed if the routing information supplied to the input switching unit 3 is changed to "000011". It should be noted that the routing information is not limited to "000011".

FIG. 10 is a block diagram of the input switching unit 3 shown in FIG. 4. In FIG. 10, the input switching unit 3 comprises a routing information changing unit 21, a final stage malfunction flag 22 and a switch 23. The input switching unit 3 changes the routing information contained in the frame format of the communication information, when a malfunction occurs in the switch network 1, based on the input and output unit changing information and the final stage malfunction flag which are sent from the. control unit 2.

The routing information changing unit 21 changes the contents of a frame format (header) of the communication information when a malfunction occurs in the switch network 1, based on the input and output unit changing information sent from the control unit 2. If the malfunctioning switch is included in the first stage, the routing information changing unit 21 changes the input address. If the malfunctioning switch is included in the final stage, the routing information changing unit 21 changes the output address. If the malfunctioning switch is included in the intermediate stage, the routing information changing unit 21 changes one of the input address and the output address.

The final stage malfunction flag changing unit 22 changes the status of the final stage malfunction flag contained in the frame format of the communication information, when a malfunction occurs in the switch network 1, based on the final stage malfunction flag sent from the control unit 2. When the malfunctioning switch is included in the final stage of the switch network 1 or when the malfunctioning switch is included in the intermediate stage of the switch network 1 and the output address is to be changed, the final stage malfunction flag changing unit 22 sets the final stage malfunction flag to "1".

The switch 23 changes an input direction of the communication information based on the changed frame format of the communication information when the malfunctioning switch is included in the first stage of the switch network 1 or when the malfunctioning switch is included in the intermediate stage and the input address is to be changed.

Figure 11:
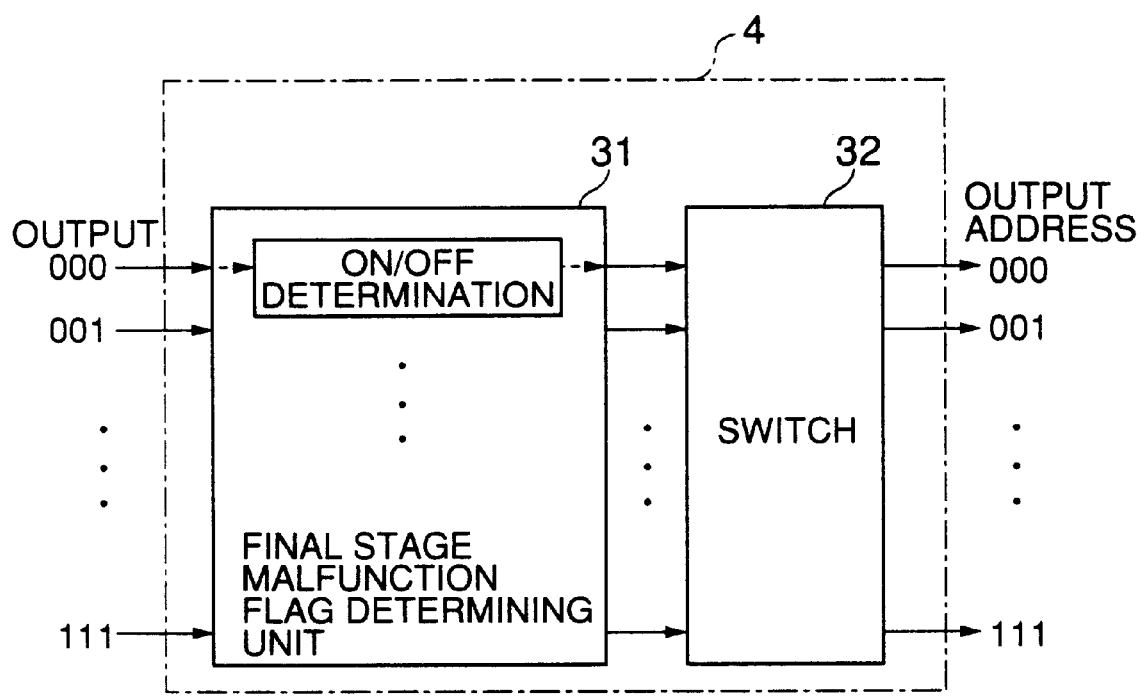
FIG. 11 is a block diagram of an output switching unit shown in FIG. 4.

FIG. 11 is a block diagram of the output switching unit 4 shown in FIG. 4. In FIG. 11, the output switching unit 4 comprises a final stage malfunction flag determining unit 31 and a switch 32. The output switching unit 4 switches an outputting direction of the communication information to be sent to one of the output addresses, when a malfunction occurs in the switch network 1, based on the input and output unit changing information and the final stage malfunction flag which are sent from the control unit 2.

The final stage malfunction flag determining unit 31 determines the status of the final stage malfunction flag contained in the frame format of the communication information. When a result of the determination of the final stage malfunction flag determining unit 31 indicates "ON", the switch 32 changes the output address based on the routing information contained in the frame format of the communication information.

Figure 12A:
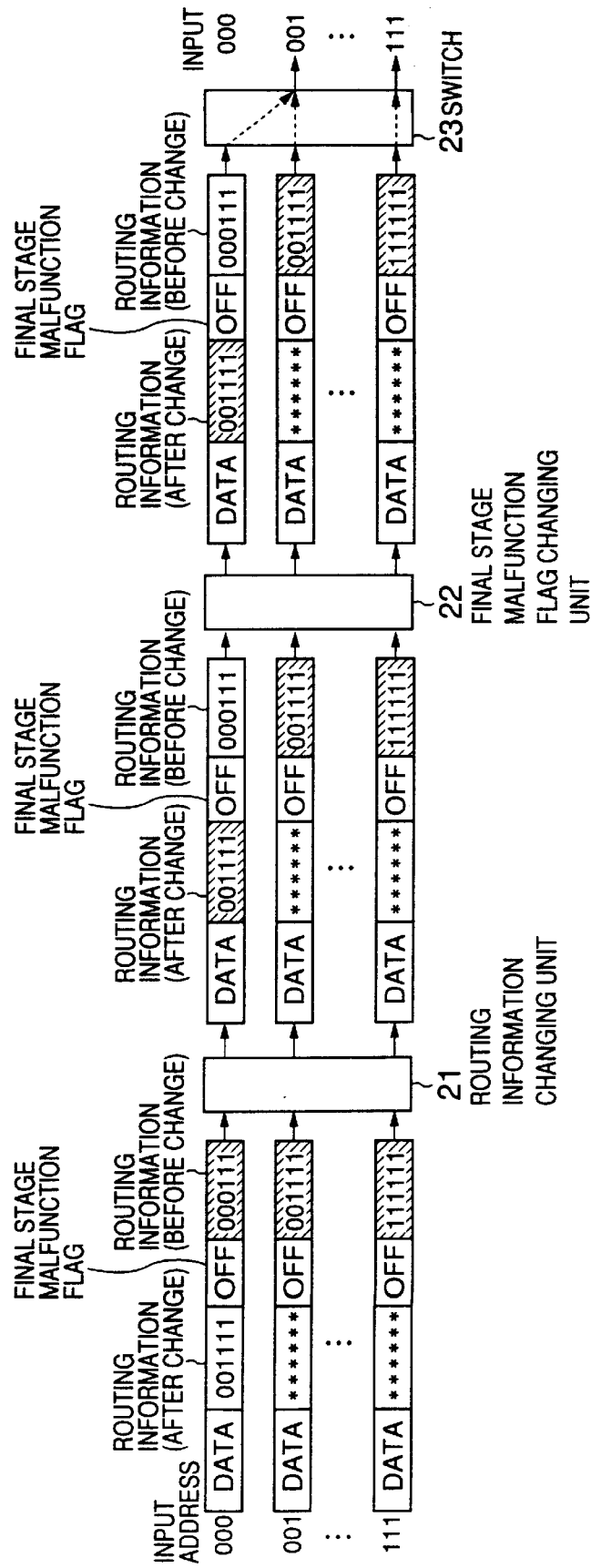
FIG. 12A is an illustration for explaining an operation of an input switching unit shown in FIG. 10 when a malfunction occurs in one of the switches in the first stage.
Figure 12B:
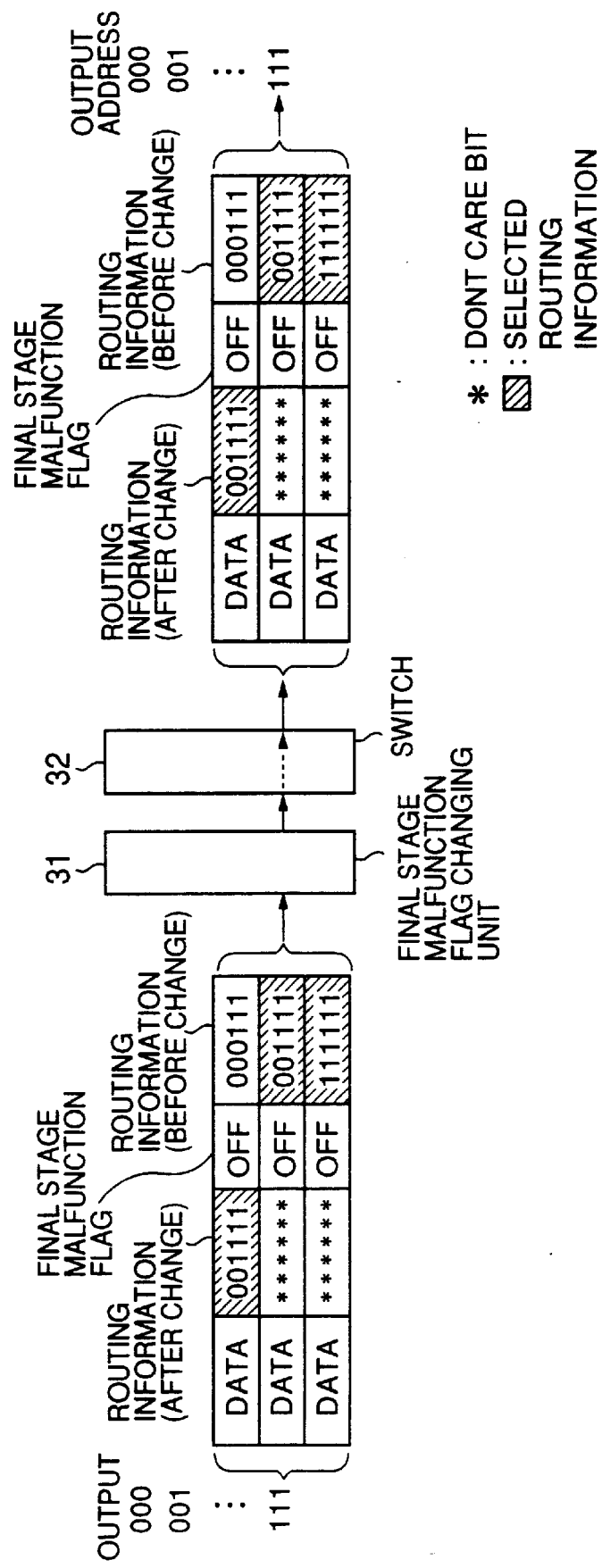
FIG. 12B is an illustration for explaining an operation of an output switching unit shown in FIG. 11 when a malfunction occurs in one of the switches in the first stage.

FIGS. 12A is an illustration for explaining a change in the frame format made by the input switching unit 3 shown in FIG. 10 when a malfunction occurs in one of the switches included in the first stage as is in the case shown in FIG. 6A. FIG. 12B is an illustration for explaining a change in the frame format made by the output switching unit 4 shown in FIG. 11 when a malfunction occurs in one of the switches included in the first stage as is in the case shown in FIG. 6A. It should be noted that a change of the frame format when the malfunctioning switch is included in the intermediate stage and the input address is to be changed is the same as that of the case in which the malfunctioning switch is included in the first stage of the switch network 1.

In FIG. 12A, when the frame, format (routing information before change "000111", a final stage malfunction flag "OFF") of the communication information is input to the input address "000" of the input switching unit 3, the routing information changing unit 21 changes the routing information to, "001111", for example, based on the input and output unit changing information produced by the control unit 2 as is in the case shown in FIGS. 6A and 6B. At this time, the routing information before change is maintained.

When the routing information is changed to "001111", the input address in the frame format of the communication information is changed from "000" to "001" by the switch 23. The communication information input to the input address "001" of the switch network 1 is output from the output address "111" of the switch network 1.

As shown in FIG. 12B, the frame format of the communication information output from the output address "111" of the switch network 1 is output to the output address "111" of the output switching unit 4 via the final stage malfunction flag determining unit 31 and the switch 32 while the:present information is also maintained.

FIGS. 13A is an illustration for explaining a change in the frame format made by the input switching unit 3 shown in FIG. 10 when a malfunction occurs in one of the switches included in the final stage as is in the case shown in FIG. 7A. FIG. 13B is an illustration for explaining a change in the frame format made by the output switching unit 4 shown in FIG. 11 when a malfunction occurs in one of the switches included in the final stage as is in the case shown in FIG. 7A. It should be noted that a change in the frame format when the malfunctioning switch is included in the intermediate stage and the output address is to be changed is the same as that of the case in which the malfunctioning switch is included in the final stage of the switch network 1.

In FIG. 13A, when the frame format (routing information before change "000111", a final stage malfunction flag "OFF") of the communication information is input to the input address "000" of the input switching unit 3, the routing information changing unit 21 changes the routing information to "000011", for example, based on the input and output unit changing information produced by the control unit 2 as is in the case shown in FIGS. 7A and 7B. At this time, the routing information before change is maintained.

When the routing information is changed to "000011", the status of the final stage malfunction flag is changed to "ON" by the final stage malfunction flag changing unit 22. Additionally, the input address "000" is output to the switch network 1 via the switch 23. Thus, the communication information input to the input address "000" of the switch network 1 is output from the output address "011" of the switch network 1.

As shown in FIG. 13B, the frame format of the communication information output from the output address "011" of the switch network 1 is output to the output address "111" of the output switching unit 4 after the status of the final stage malfunction flag is determined by the final stage malfunction flag determining unit 31 and changed to the routing information before change "111" while the present information is also maintained.

Figure 14:
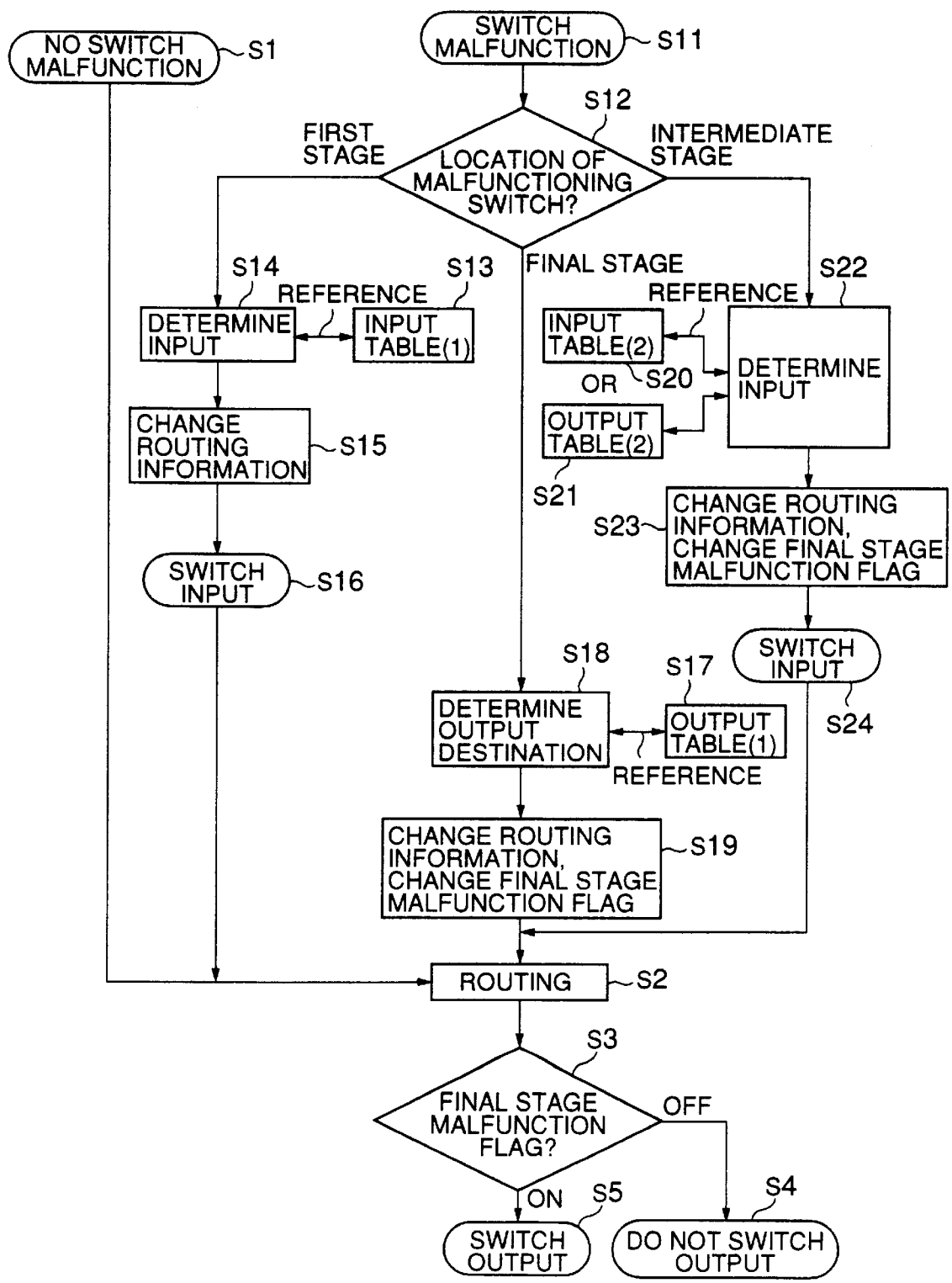
FIG. 14 is a flowchart of an operation of the exchange shown in FIG. 4.

FIG. 14 is a flowchart of an operation of the exchange according to the present embodiment when the exchange is in a normal condition or when a malfunction occurs in the switch network 1 as shown in FIGS. 15A and 15B, 16A and 16B, 17A and 17B, and 18A and 18B. In the operation shown in FIG. 14, it is assumed that the communication information having routing information "000111" in the frame format is input, in step S1, to the input address "000" of the input switching unit 3 when the exchange is normally operated. The communication information is input to the input address "000" of the switch network 1 as shown in FIGS. 15A, 16A, 17A and 18A via the routing information changing unit 21, the final stage malfunction flag changing unit 22 and the switch 23 in the input switching unit 3.

Figure 15A:
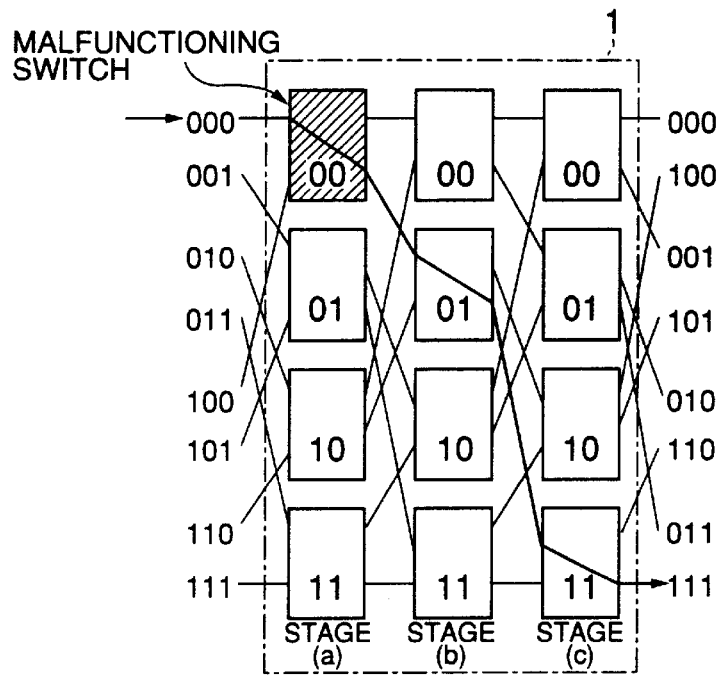
FIG. 15A is an illustration for explaining a transmission path formed in the switch network before a change is made to the transmission path when a malfunction occurs in one of the switches in the first stage.

Then, in step S2, a routing from the input address "000" to the output address "111" is performed. Each of the switches included in the switch network 1 has the 0-input terminal, 1-input terminal, 0-output terminal and the 1-output terminal as shown in FIG. 6C. Each digit of the input address "000" corresponds to the input terminal of each of the switches in the respective stages (a), (b) and (c). Each digit of the output address "111" corresponds to the output terminal of each of the switches in the respective stages (a), (b) and (c). Specifically, as shown in FIG. 15A, the communication information input to the input address "000" of the switch network 1 is input to the 0-input terminal of the switch having the switch address "00" in the stage (a), and is output from 1-output terminal of the same switch. The communication information is then input to the 0-input terminal of the switch. having the switch address "01"in the stage (b), and is output from the 1-output terminal of the same switch. After that, the communication information is input to the 0-input terminal of the switch having the switch address "11"in the stage (c), and is output from the 1-output terminal of the same switch. Finally, the communication information is output from the output address "111" of the switch network 1.

The communication information output from the switch network 1 is input to the input address "111" of the output switching unit 4. In step S3, the final stage malfunction flag determining unit 31 of the output switching unit 4 determines whether the final stage malfunction flag is "ON" or "OFF". In this case, since the switch network 1 is normally operating, it is determined that the final stage malfunction flag is "OFF". Thus, the communication information is output, in step S4, to the output address "111" of the output switching unit 4 via the switch 32.

On the other hand, when a malfunction occurs in one of the switches in the switch network 1 in step S11, the exchange according to the present embodiment detects, in step S12, the location of the malfunctioning switch by the malfunctioning switch detecting unit 5.

If the switch address "00" in the stage (a) (the first stage) is detected by the malfunction detecting unit 5 as the location of the malfunctioning switch, the selecting unit 11 refers to the input table (1) information stored in the input table (1) storing,unit 7 in step S13. The input table (1) information provides, for example, the information shown in FIG. 6B, and the selecting unit 11 refers to the "input address after change" in a case in which the input address of the switch network 1 is "000" and the address of the malfunctioning switch is "00" (indicated by hatched portions in FIG. 6B). Thus, the selecting unit 11 selects, in step S14, a transmission path which routes from one of the input addresses other than the input addresses "000" and "100" to the output address "111" so as to bypass the malfunctioning switch. Accordingly, the selecting unit 11 sends to the input switching unit 3 the input and output unit changing information which provides an instruction to change the routing information to "001111", for example. It should be noted that the routing information to be set is not limited to "001111".

When the communication information having the routing information "001111" in the frame format is input to the input address "000" of the input switching unit 3, the routing information changing unit 21 of the input switching unit 3 changes the routing information to "001111", in step S15, based on the input and output unit changing information produced by the selecting unit 11.

After the routing information in the frame format of the communication information is changed to "001111", the communication information is passed through the final stage malfunction flag changing unit 22. Thereafter, the switch 23 changes, in step S16, the input address of the switch network 1, to which the communication information is input, from "000" to "001". Thus, the communication information is output from the switch 23 to the input address "001" of the switch network 1.

Figure 15B:
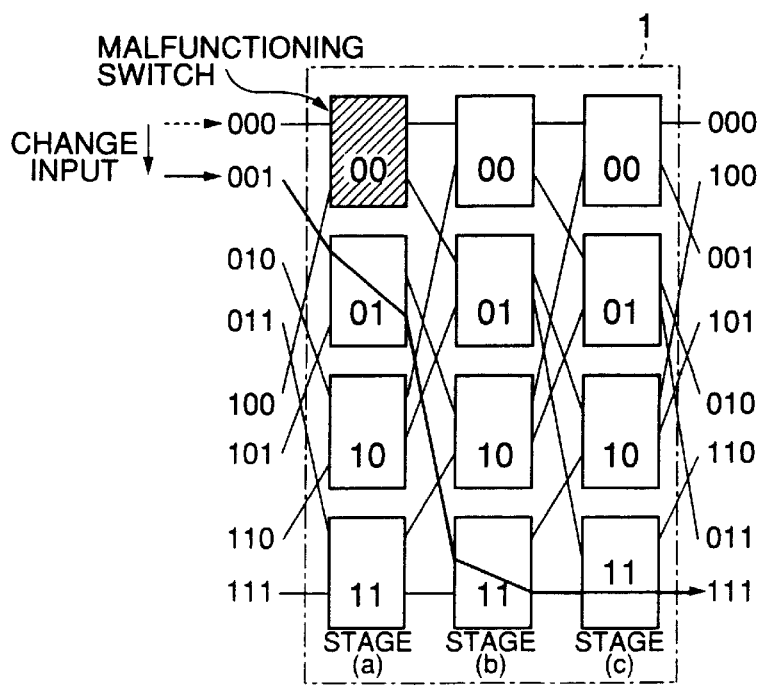
FIG. 15B is an illustration for explaining the transmission path of FIG. 15A after the change.

Then, in step S2, a routing from the input Ad address "001" to the output address "111" is performed. Each digit of the input address "001"corresponds to the input terminal of each of the switches in the respective stages (a), (b) and (c.). Each digit of the output address "111" corresponds to the output terminal of each of the switches in the respective stages (a), (b) and (c). Specifically, as shown in FIG. 15B, the communication information input to the input address "001" of the switch network 1 is input to the 0-input terminal of the switch having the switch address "00" in the stage (a), and is output from 1-output terminal of the same switch. The communication information is then input to the,0-input terminal of the switch having the switch address "11"in the stage (b), and is output from the 1-output terminal of the same switch. After that, the communication information is input to the 0-input terminal of the switch having the switch address "11"in the stage (c), and is output from the 1-output terminal of the same switch. Finally, the communication information is output from the output address "111" of the switch network 1.

The communication information output from the switch network 1 is input to the input address "111" of the output switching unit 4. In step S3, the final stage malfunction flag determining unit 31 of the output switching unit 4 determines whether the final stage malfunction flag is "ON" or "OFF". In this case, since the malfunctioning switch is included in the first stage, it is determined that the final stage malfunction flag is "OFF". Thus, the communication information is output, in step S4, to the output address "111" of the output switching unit 4 via the switch 32.

Figure 16A:
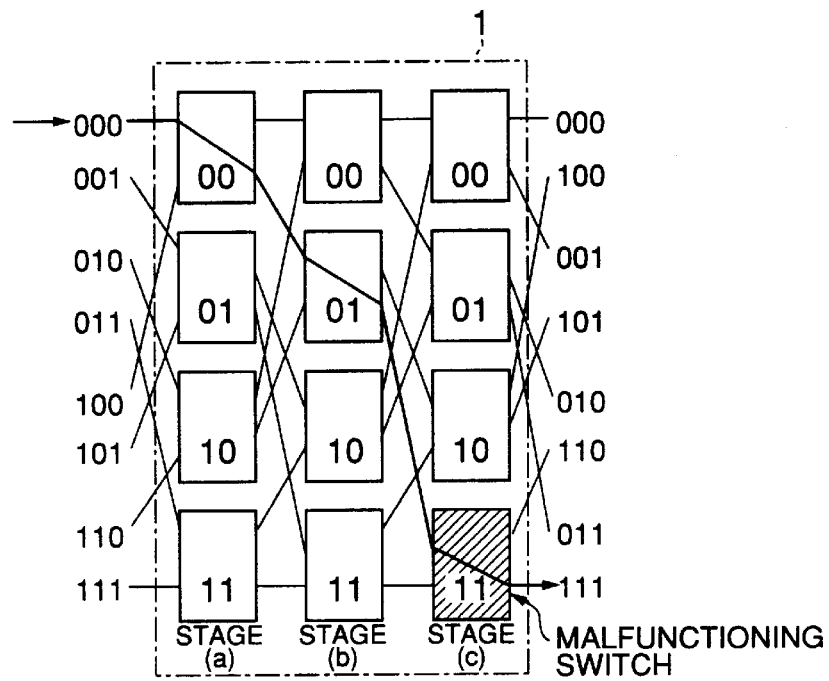
FIG. 16A is an illustration for explaining a transmission path formed in the switch network before a change is made to the transmission path when a malfunction occurs in one of the switches in the final stage.

In the process of step S12, if. the switch address "11" in the stage (c) (the final stage) is detected by the malfunction detecting unit 5 as the location of the malfunctioning switch as shown in FIG. 16A, the selecting unit 11 refers to the output table (1) information stored in the output table (1) storing unit 10 in step S17. The output table (1) information provides, for example, the information shown in FIG. 7B, and the selecting unit 11 refers to the "output address after change" in a case in which the output address of the switch network 1 is "*11" and the address of the malfunctioning switch is "11" (indicated by hatched portions in FIG. 7B). Thus, the selecting unit 11 selects, in step S18, a transmission path which is connected to output addresses other than the output addresses "111" and "110" so as to bypass the malfunctioning switch. Accordingly, the selecting unit 11 sends to the input switching unit 3 the input and output unit changing information which instructs to change the routing information to "001111", for example. It should be noted that the routing information to be set is not limited. to "001111".

When the communication information having the routing information "001111" in the frame format is input to the input address "000" of the input switching unit 3, the routing information changing unit 21 of the input switching unit 3 changes the routing information to "001111", in step S19, based on the input and output unit changing information produced by the selecting unit 11.

After the routing information in the frame format of the communication information is changed to "001111", the final stage malfunction flag changing unit 22 changes, in step S19, the final stage malfunction flag to "ON" and the communication information is output to the input address "000" of the switch network 1 via the switch 23.

Then, in step S2, a routing from the input address "001" to the output address "111" is performed in the switch network 1.

Figure 16B:
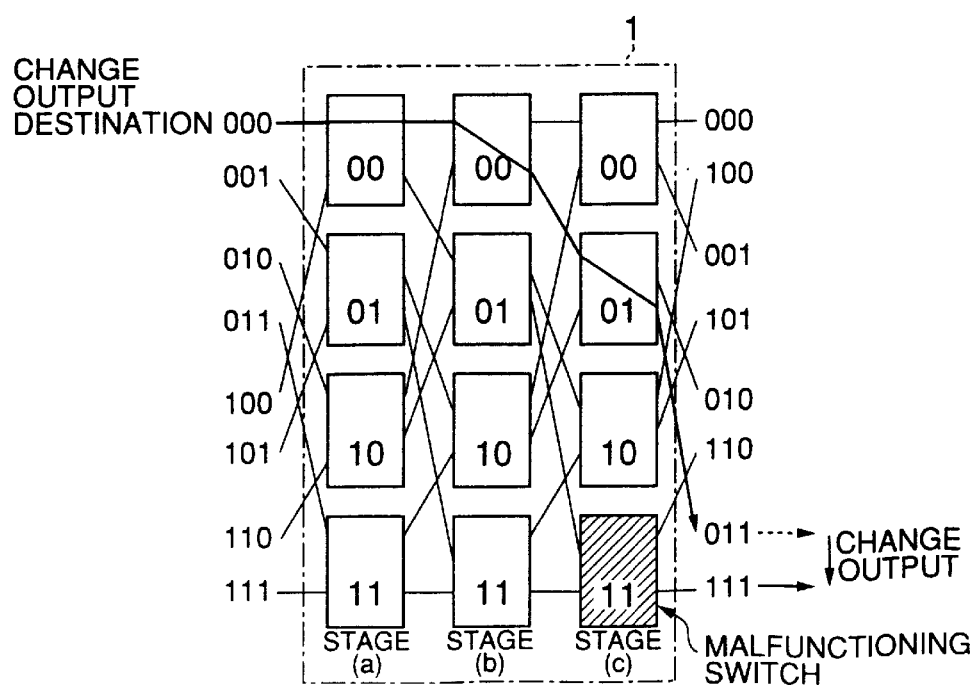
FIG. 16B is an illustration for explaining the transmission path of FIG. 15A after the change.

Each digit of the input address "000" corresponds to the input terminal of each of the switches in the respective stages (a), (b) and (c). Each digit of the output address "011" corresponds to the output terminal of each of the, switches in the respective stages (a), (b) and (c). Specifically, as shown in FIG. 16B, the communication information input to the input address "000" of the switch network 1 is input to the 0-input terminal of the switch having the switch address "00" in the stage (a), and is output from the 0-output terminal of the same switch. The communication information is then input to the 0-input terminal of the switch having the switch address "00"in the stage (b), and is output from the 1-output terminal of the same switch. After that, the communication information is input to the 0-input terminal of the switch having the switch address "01"in the stage (c), and is output from the 1-output terminal of the same switch. Finally, the communication information is output from the output address "011" of the switch network 1.

The communication information output from the switch network 1 is input to the input address "011" of the output switching unit 4. In step S3, the final stage malfunction flag determining unit 31 of the output switching unit 4 determines whether the final stage malfunction flag is "ON" or "OFF". In this case, since the malfunctioning switch is included in the final stage, it is determined that the final stage malfunction flag is "ON". Thus, the switch 32 changes, in step 5, the output address to which the communication information is output to the original output address "111", and the communication information is output to the output address "111" of the output switching unit 4 via the switch 32. Since the switching operation of the output switching unit 4 can be performed based on the determination by the final stage malfunction flag determining unit 31 as to whether the final stage malfunction flag is "ON" or "OFF", the output switching unit 4 can perform the switching of the output address without a direct instruction from the control unit 2.

Figure 17A:
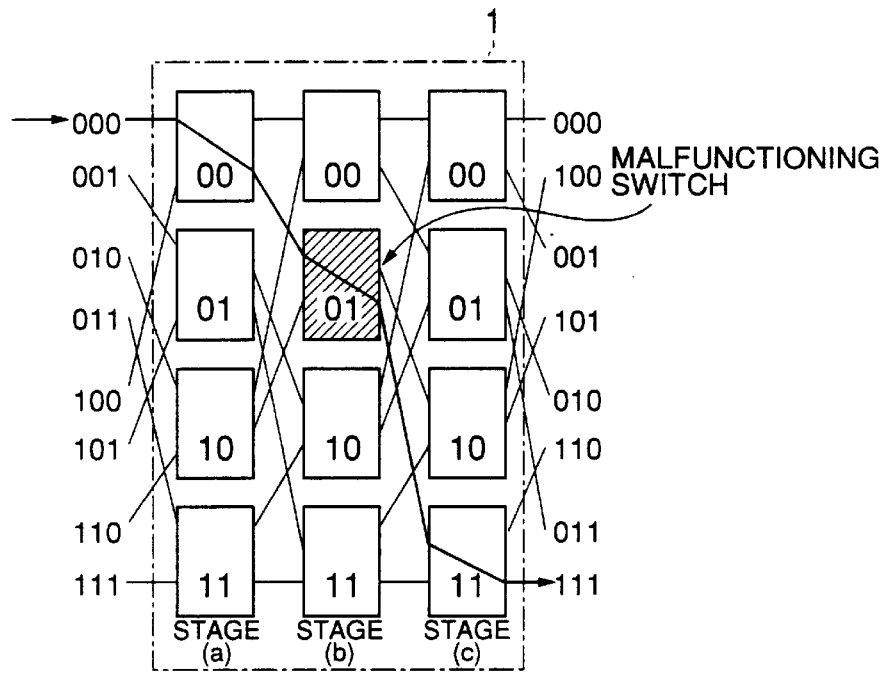
FIG. 17A is an illustration for explaining a transmission path formed in the switch network before a change is made to the transmission path when a malfunction occurs in one of the switches in the intermediate stage.

In the process of step S12, if the switch address "01" in the stage (b) (the intermediate stage) is detected by the malfunction detecting unit 5 as the location of the malfunctioning switch as shown in FIG. 17A and if an instruction is provided to change the input address so as to bypass the malfunctioning switch when the malfunctioning switch is located in the intermediate stage of the switch network 1, the selecting unit 11 refers to the input table (2) information stored in the input table (2) storing unit 8 in step S20.

The input table (2) information provides, for example, the information shown in FIG. 8B, and the selecting unit 11 refers to the "input address after change" in a case in which the input address of the switch network 1 is "000" and the address of the malfunctioning switch is "01" (indicated by hatched portions in FIG. 8B). Thus, the selecting unit 11 selects, in step S22, a transmission path routing from an input address other than the input addresses "000", "010", "100" and "110" to the output address "111" so as to bypass the malfunctioning switch. Accordingly, the selecting unit 11 sends to the input switching unit 3 the input and output unit changing information which instructs to change the routing information to "001111", for example. It should be noted that the routing information to be set is not limited to "001111".

When the communication information having the routing information "001111" in the frame format is input to the input address "000" of the input switching unit 3, the routing information changing unit 21 of the input switching unit 3 changes the routing information to "001111", in step S23, based on the input and output unit changing information produced by the selecting unit 11.

After the routing information in the frame format of the communication information is changed to "001111", the communication information is passed through the final stage malfunction flag changing unit 22. Thereafter, the final stage malfunction flag changing unit 22 changes, in step S24, the input address of the switch network 1, to which the communication information is input, from "000" to "001". Thus, the communication information is output from the switch 23 to the input address "001" of the switch network 1.

Then, in step S2, a routing from the input address "001" to the output address "111" is performed in the switch network 1.

Each digit of the input address "001" corresponds to the input terminal of each of the switches in the respective stages (a), (b) and (c).

Figure 17B:
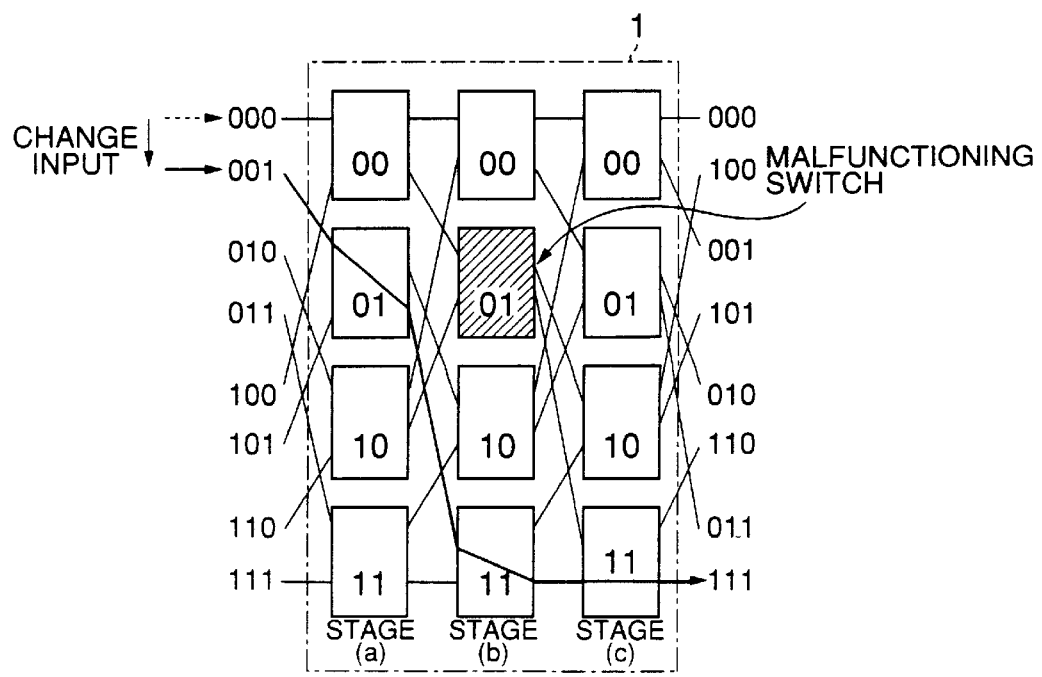
FIG. 17B is an illustration for explaining the transmission path of FIG. 15A after the change.

Each digit of the output address "111" corresponds to the output terminal of each of the switches in the respective stages (a), (b) and (c). Specifically, as shown in FIG. 17B, the communication information input to the input address "000" of the switch network 1 is input to the 0-input terminal of the switch having the switch address "00" in the stage (a), and is output from 1-output terminal of the same switch. The communication information is then input to the 0-input terminal of the switch having the switch address "01" in the stage (b), and is output from the 1-output terminal of the same switch. After that, the communication information is input to the 0-input terminal of the switch having the switch address "11" in the stage (c), and is output from the 1-output terminal of the same switch. Finally, the communication information is output from the output address "111" of the switch-network 1.

The communication information output from the switch network 1 is input to the input address "111" of the output switching unit 4. In step S3, the final stage malfunction flag determining unit 31 of the output switching unit 4 determines whether the final stage malfunction flag is "ON" or "OFF". In this case, since the instruction is provided so as to change the input address when a malfunction occurs in one of the switches in the intermediate stage, it is determined that the final stage malfunction flag is "OFF". Thus, the communication information is output, in step S4, to the output address "111" of the output switching unit 4 via the switch 32.

Figure 18A:
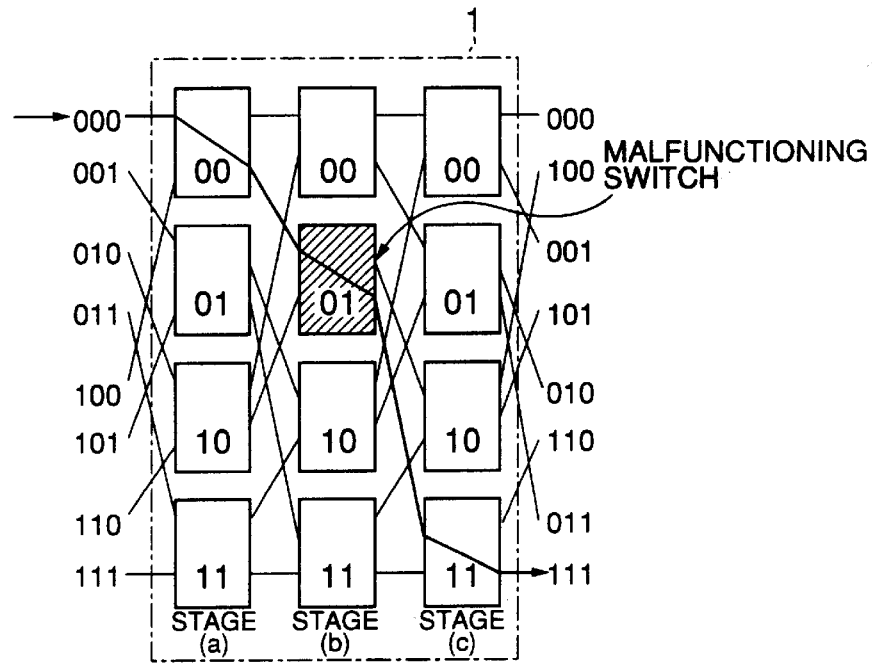
FIG. 18A is an illustration for explaining a transmission path formed in the switch network before a change is made to the transmission path when a malfunction occurs in one of the switches in the first stage.

In the process of step S12, if the switch address "11" in the stage (c) (the final stage) is detected by the malfunction detecting unit 5 as the location of the malfunctioning switch as shown in FIG. 18A and if an instruction is provided so as to change the output address of the switch network 1 when a malfunction occurs in one of the switches in the intermediate stage, the selecting unit 11 refers to the output table (2) information stored in the output table (2) storing unit 9 in step S21. The output table (1) information provides, for example, the information shown in FIG. 9B, and the selecting unit 11 refers to the "output address after change" in a case in which the output address of the switch network 1 is "111" and the address of the malfunctioning switche is "01" (indicated by hatched portions in FIG. 9B). Thus, the selecting unit 11 selects, in step S22, a transmission path which is connected to an output address other than the output addresses "111", "110", "101 and "100" so as to bypass the malfunctioning switch. Accordingly, the selecting unit 11 sends to the input switching unit 3 the input and output unit changing information which provides an instruction to change the routing information to "000011", for example. It should be noted that the routing information to be set is not limited to "000011".

When the communication information having the routing information "000011" in the frame format is input to the input address "000" of the input switching unit 3, the routing information changing unit 21 of the input switching unit 3 changes the routing information to "000011", in step S23, based on the input and output unit changing information produced by the selecting unit 11.

After the routing information in the frame format of the communication information is changed to "000011", the final stage malfunction flag changing unit 22 changes, in step S23, the final stage malfunction flag to "ON" and the communication information is output to the input address "000" of the switch network 1 via the switch 23.

Then, in step S2, a routing from the input address "000" to the output address "011" is performed in the switch network 1.

Figure 18B:
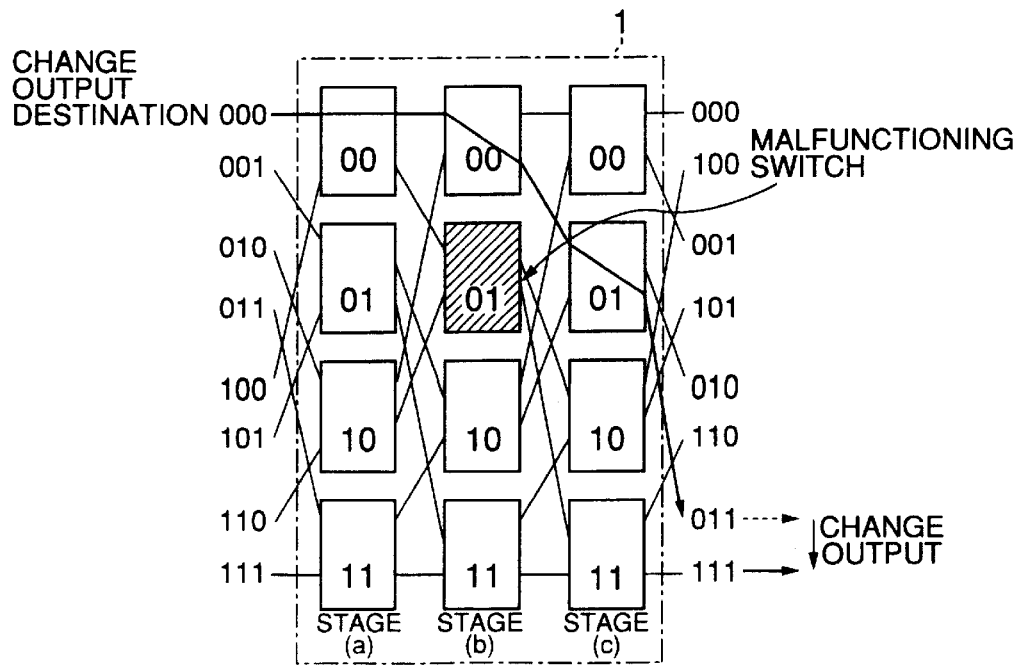
FIG. 18B is an illustration for explaining the transmission path of FIG. 15A after the change.

Each digit of the input address "000" corresponds to the input terminal of each of the switches in the respective stages (a), (b) and (c). Each digit of the output address "011" corresponds to the output terminal of each of the switches in the respective stages (a), (b) and (c). Specifically, as shown in FIG. 18B, the communication information input to the input address "000" of the switch network 1 is input to the 0-input terminal of the switch having the switch address "00" in the stage (a), and is output from the 0-output terminal of the same switch. The communication information is then input to the 0-input terminal of the switch having the switch address "00" in the stage (b), and is output from the 1-output terminal of the same switch. After that, the communication information is input to the 0-input terminal of the switch having the switch address "01" in the stage. (c), and is output from the 1-output terminal of the same switch. Finally, the communication information is output from the output address "011" of the switch network 1.

The communication information output from the switch network 1 is input to the input address "011" of the output switching unit 4. In step S3, the final stage malfunction flag determining unit 31 of the output switching unit 4 determines whether the final stage malfunction flag is "ON" or "OFF". In this case, since the instruction is provided so as to change the output address of the switch network 1 when a malfunction occurs in one of the switches in the intermediate switch, it is determined that the final stage malfunction flag is "ON". Thus, the switch 32 changes, in step 5, the output address, to which the communication information is output, to the original output address "111", and the communication information is output to the output address "111" of the output switching unit 4 via the switch 32. Since the switching operation of the output switching unit 4 can be performed based on the determination by the final stage malfunction flag determining unit 31 as to whether the final stage malfunction flag is "ON" or "OFF" by the, the output switching unit 4 can perform the switching of the output address without a direct instruction from the control unit 2.

As mentioned above, according to the exchange of the present embodiment, when a malfunction occurs in the switch network 1 in which a transmission path is formed to transmit the communication information, only the transmission path including the malfunctioning switch is changed so as to bypass the malfunctioning switch. Thus, the exchange according to the present embodiment does not have spare switches which would cause an increase in the weight and size of the entire system.

The present invention is not limited to the specifically disclosed embodiments, and variations and modifications may be made without departing from the scope of the present invention.

What is claimed is:

1. An exchange setting a transmission path for transmitting communication information through a switch network comprising a plurality of switches, said switch network being provided with a plurality of inputs and a plurality of outputs so that the transmission path is formed between one of the inputs and one of the outputs by routing the switches and said switch network, said exchange changing a route of the transmission path when a malfunction occurs in one of the switches included in the transmission path so as to bypass the malfunctioning switch, said exchange comprising:

a malfunctioning switch detecting unit detecting a location of the malfunctioning switch in said switch network; and changing means for changing the route of the transmission path by switching one of the inputs which is connected to the transmission path or one of the outputs which is connected to the transmission path based on the predetermined routing information so as to bypass the malfunctioning switch, wherein said changing means comprises:

a storing unit which stores table information indicating a plurality of routes each of which bypass one of the switches in said switch network, each of the routes being indicated in relation to one of the inputs and outputs of the switch network;

a selecting unit selecting one of the routes indicated in said table information so as to change the route of the transmission path to bypass the malfunctioning switch, an input switching unit switching the input of said switch network;

an output switching means switching the output of said switch network; and input and output selecting means for selecting one of said input switching unit or said output switching unit so that said changing means changes the route of the transmission path by the selected one of said input switching unit or said output switching unit.

2. The exchange as claimed in claim 1, wherein said input and output selecting means selects said input switching unit when the malfunctioning switch is one of the switches directly connected to said input switching unit.

3. The exchange as claimed in claim 1, wherein said input and output selecting means selects said output switching unit when the malfunctioning switch is one of the switches directly connected to said output switching unit.

4. The exchange as claimed in claim 1, wherein said input and output selecting means selects said input switching unit when the malfunctioning switch is one of the switches other than the switches directly connected to one of said input switching unit and said output switching unit.

5. The exchange as claimed in claim 1, wherein said input and output selecting means selects said output switching unit when the malfunctioning switch is one of the switches other than the switches directly connected to one of said input switching unit and said output switching unit.

* * * * *